United States Patent
St. John et al.

(10) Patent No.: US 10,345,058 B1
(45) Date of Patent: Jul. 9, 2019

(54) SCALE REMOVAL IN HUMIDIFICATION-DEHUMIDIFICATION SYSTEMS

(71) Applicant: Gradiant Corporation, Woburn, MA (US)

(72) Inventors: Maximus G. St. John, Boston, MA (US); Jonn-Ross Andrews, Somerville, MA (US); Prakash Narayan Govindan, Melrose, MA (US)

(73) Assignee: Gradiant Corporation, Woburn, MA (US)

(*) Notice: Subject to any disclaimer, the term of this patent is extended or adjusted under 35 U.S.C. 154(b) by 277 days.

(21) Appl. No.: 15/355,242

(22) Filed: Nov. 18, 2016

Related U.S. Application Data

(60) Provisional application No. 62/256,852, filed on Nov. 18, 2015.

(51) Int. Cl.
| | |
|---|---|
| *F28G 9/00* | (2006.01) |
| *C02F 1/04* | (2006.01) |
| *B01D 1/00* | (2006.01) |
| *B01D 5/00* | (2006.01) |
| *B08B 9/027* | (2006.01) |
| *F28G 15/00* | (2006.01) |
| *C02F 103/08* | (2006.01) |

(52) U.S. Cl.
CPC .............. *F28G 9/00* (2013.01); *B01D 1/0011* (2013.01); *B01D 5/006* (2013.01); *B01D 5/0054* (2013.01); *B08B 9/027* (2013.01); *C02F 1/048* (2013.01); *F28G 15/003* (2013.01); *C02F 2103/08* (2013.01)

(58) Field of Classification Search
CPC ....... F28G 9/00; F28G 15/003; B01D 1/0011; B01D 5/0054; B01D 5/006; B01D 9/027; B08B 9/027; C02F 1/048; C02F 2103/048
See application file for complete search history.

(56) References Cited

U.S. PATENT DOCUMENTS

| | | | |
|---|---|---|---|
| 3,298,931 | A | 1/1967 | Herbert et al. |
| 3,331,773 | A | 7/1967 | Gunderson et al. |
| 3,969,193 | A | 7/1976 | Sakuma et al. |
| 3,992,301 | A | 11/1976 | Shippey et al. |
| 4,047,851 | A | 9/1977 | Bender |
| 4,664,751 | A | 5/1987 | Lloyd |
| 4,708,805 | A | 11/1987 | D'Muhala |
| 4,973,201 | A | 11/1990 | Paul et al. |

(Continued)

FOREIGN PATENT DOCUMENTS

| | | |
|---|---|---|
| CA | 2 816 746 C | 11/2012 |
| CN | 101614502 A | 12/2009 |

(Continued)

OTHER PUBLICATIONS

[No Author Listed], Alfa CIP 75/Alfa CIP 200/Alfa CIP 400 Instruction Manual. Alfa Laval. 2610 Rødovre, Denmark. 1995. 47 pages.

(Continued)

*Primary Examiner* — Sharidan Carrillo
(74) *Attorney, Agent, or Firm* — Wolf, Greenfield & Sacks, P.C.

(57) ABSTRACT

Systems and methods for the removal of scale in humidification-dehumidification desalination apparatuses are generally described.

21 Claims, 1 Drawing Sheet

(56) References Cited

U.S. PATENT DOCUMENTS

| | | | |
|---|---|---|---|
| 4,980,077 A | 12/1990 | Morris et al. | |
| 5,167,828 A | 12/1992 | Emmons et al. | |
| 5,190,656 A | 3/1993 | Paul et al. | |
| 5,329,950 A | 7/1994 | Barinas | |
| 5,425,902 A | 6/1995 | Miller et al. | |
| 5,647,973 A | 7/1997 | Desaulniers | |
| 6,086,722 A | 7/2000 | Webster et al. | |
| 6,443,170 B1 | 9/2002 | Vansant et al. | |
| 6,490,872 B1 | 12/2002 | Beck et al. | |
| 7,081,205 B2 | 7/2006 | Gordon et al. | |
| 7,220,358 B2 | 5/2007 | Schacht et al. | |
| 7,997,623 B2 | 8/2011 | Williams | |
| 8,197,696 B1 | 6/2012 | Bader | |
| 8,252,092 B2 | 8/2012 | Govindan et al. | |
| 8,292,272 B2 | 10/2012 | Elsharqawy et al. | |
| 8,361,321 B2 | 1/2013 | Stetson et al. | |
| 8,465,006 B2 | 6/2013 | Elsharqawy et al. | |
| 8,496,234 B1 | 7/2013 | Govindan et al. | |
| 8,523,985 B2 | 9/2013 | Govindan et al. | |
| 8,727,325 B2 | 5/2014 | Sparrow et al. | |
| 8,778,065 B2 | 7/2014 | Govindan et al. | |
| 8,820,723 B1 | 9/2014 | Sparrow et al. | |
| 8,864,911 B2 | 10/2014 | Xiong et al. | |
| 9,072,984 B2 | 7/2015 | Govindan et al. | |
| 9,221,694 B1* | 12/2015 | Govindan | C02F 1/042 |
| 9,550,685 B2 | 1/2017 | Klausner et al. | |
| 2004/0083565 A1 | 5/2004 | Schildmann et al. | |
| 2004/0113291 A1 | 6/2004 | Klausner et al. | |
| 2004/0187897 A1 | 9/2004 | Kenowski et al. | |
| 2007/0110864 A1 | 5/2007 | Galloway | |
| 2007/0181496 A1 | 8/2007 | Zuback | |
| 2008/0105282 A1 | 5/2008 | Fernholz et al. | |
| 2008/0210262 A1 | 9/2008 | Lauzon | |
| 2009/0188861 A1 | 7/2009 | Higgin | |
| 2009/0200234 A1 | 8/2009 | Schacht et al. | |
| 2010/0083988 A1 | 4/2010 | Jacquinet | |
| 2010/0292844 A1 | 11/2010 | Wolf | |
| 2011/0017584 A1 | 1/2011 | Stevenson et al. | |
| 2012/0161340 A1 | 6/2012 | Sween | |
| 2012/0312755 A1 | 12/2012 | Ryan et al. | |
| 2013/0074694 A1* | 3/2013 | Govindan | B01D 5/0027 95/150 |
| 2013/0075940 A1 | 3/2013 | Govindan et al. | |
| 2014/0263055 A1* | 9/2014 | Govindan | C02F 5/12 210/638 |
| 2015/0047963 A1 | 2/2015 | Roch et al. | |
| 2015/0083577 A1 | 3/2015 | Govindan et al. | |
| 2015/0129410 A1 | 5/2015 | Govindan et al. | |
| 2015/0166371 A1* | 6/2015 | Escher | B01D 61/364 210/640 |
| 2017/0334737 A1 | 11/2017 | Govindan et al. | |

FOREIGN PATENT DOCUMENTS

| | | |
|---|---|---|
| CN | 201427997 Y | 3/2010 |
| CN | 102094211 A | 6/2011 |
| CN | 102732901 A | 10/2012 |
| EP | 0 903 320 A1 | 3/1999 |
| JP | H05-208199 A | 8/1993 |
| KR | 20050007794 A | 1/2005 |
| KR | 20050007798 A | 1/2005 |
| KR | 20090067899 A1 | 6/2009 |
| WO | WO 2006/130758 A1 | 12/2006 |
| WO | WO 2007/128062 A1 | 11/2007 |
| WO | WO 2012/142396 A1 | 10/2012 |
| WO | WO 2012/159203 A1 | 11/2012 |
| WO | WO 2014/200829 A1 | 12/2014 |
| WO | WO 2015/077887 A1 | 6/2015 |

OTHER PUBLICATIONS

Bourouni et al., Water desalination by humidification and dehumidification of air: State of the art. Desalination. May 1, 2001;137(1-3):167-76.

CHENOWETH, General Design of Heat Exchangers for Fouling Conditions. Fouling Science and Technology. Kluwer Academic Publishers. 1988:477-94.

Govindan et al., Thermodynamic analysis of humidification dehumidification desalination cycles. Desalination and Water Treatment. Apr. 2010;16:339-53.

GOVINDAN, Thermal Design of Humidification Dehumidificaiton Systems for Affordable and Small-scale Desalination. Doctoral Thesis. Massachusetts Institute of Technology. Sep. 2012 286 pages.

KUENZEL, Chapter 3—On-line Cleaning Methods, Part 1—Cleaning Methods for Graphite Heat Exchangers. Handbook Heat Exchanger Fouling—Mitigation and Cleaning Technologies. Publico Publications. Essen, Germany. Ed. Hans Mueller-Steinhagen. 2000. pp. 176-184.

KUHLMANN, Chapter 5—Fouling Monitoring. Handbook Heat Exchanger Fouling—Mitigation and Cleaning Technologies. Publico Publications. Essen, Germany. Ed. Hans Mueller-Steinhagen. 2000. pp. 320-332.

LI, Mineral Precipitation in Cooling Systems Using Impaired Waters: Mechanisms, Kinetics, and Inhibition. Doctoral Thesis. University of Pittsburgh. Jul. 2010. 250 pages.

MUELLER-STEINHAGEN, Chapter 1—Introduction. Handbook Heat Exchanger Fouling—Mitigation and Cleaning Technologies. Publico Publications. Essen, Germany. Ed. Hans Mueller-Steinhagen. 2000. pp. 2-28.

MUELLER-STEINHAGEN, Chapter 2—Off-Line Cleaning Methods, Part 1—Introductory Remarks. Handbook Heat Exchanger Fouling—Mitigation and Cleaning Technologies. Publico Publications. Essen, Germany. Ed. Hans Mueller-Steinhagen. 2000. pp. 30-42.

Paton et al., Water Treatment for Fossil Fuel Power Generation. E.ON UK plc. Jan. 2006 187 pages.

Seigworth et al., Case study: Integrating memebrand processes with evaporation to achieve economical zero liquid discharge at the Doswell Combined Cycle Facility. Desalination. 1995;102:81-6.

WARLIN, Chapter 4—Cleaning of special Construction Heat Exchangers. Handbook Heat Exchanger Fouling—Mitigation and Cleaning Technologies. Publico Publications. Essen, Germany. Ed. Hans Mueller-Steinhagen. 2000. pp. 308-318.

U.S. Appl. No. 15/600,532, filed May 19, 2017, Govindan et al.

* cited by examiner

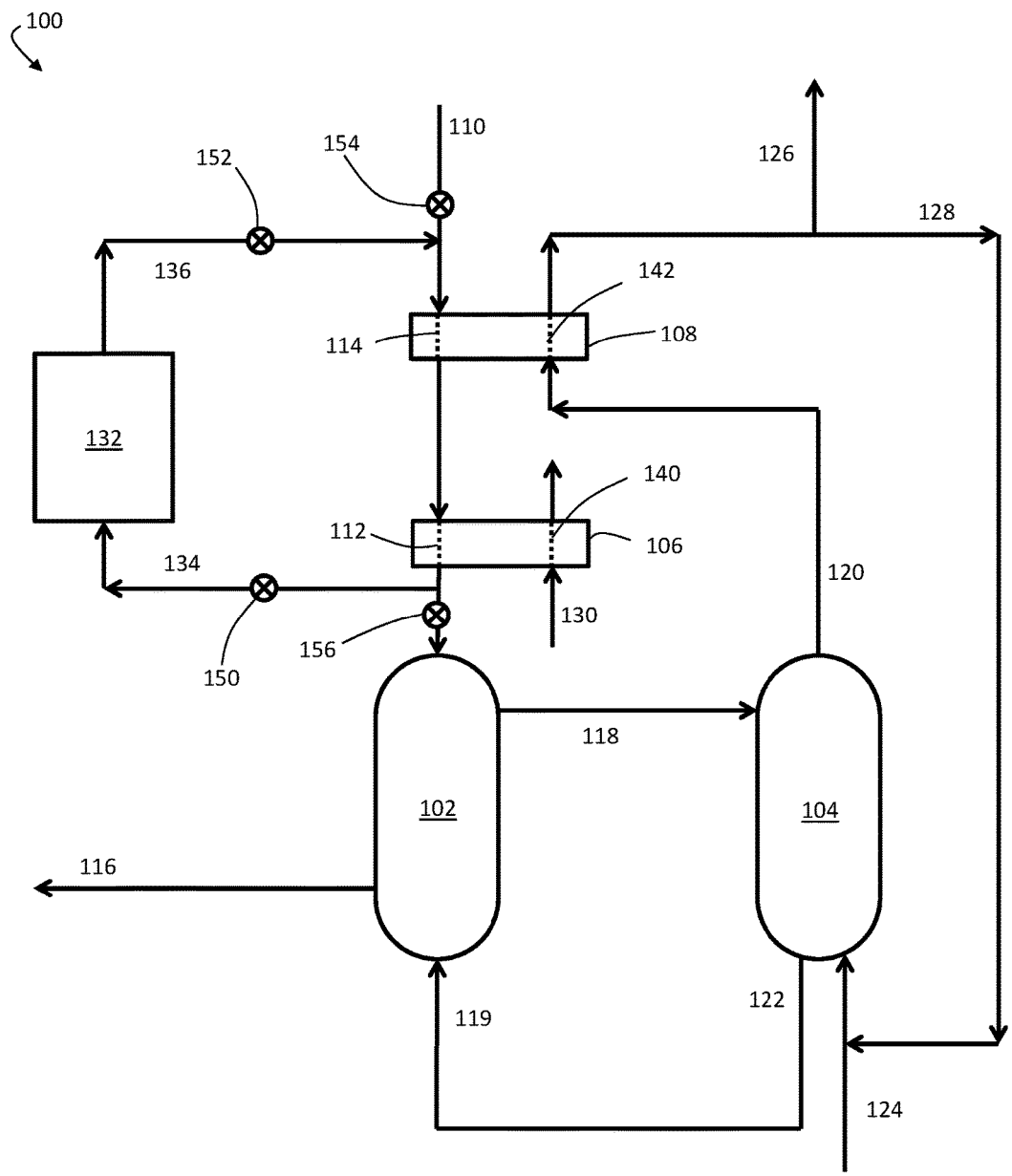

SCALE REMOVAL IN HUMIDIFICATION-DEHUMIDIFICATION SYSTEMS

RELATED APPLICATIONS

This application claims priority under 35 U.S.C. § 119(e) to U.S. Provisional Patent Application Ser. No. 62/256,852, filed Nov. 18, 2015 and entitled "Scale Removal in Humidification-Dehumidification Systems," which is incorporated herein by reference in its entirety for all purposes.

TECHNICAL FIELD

The removal of scale in humidification-dehumidification systems is generally described.

BACKGROUND

Fresh water shortages are becoming an increasing problem around the world, with demand for fresh water for human consumption, irrigation, and/or industrial use continuing to grow. In order to meet the growing demand for fresh water, various desalination methods may be used to produce fresh water from salt-containing water such as seawater, brackish water, water produced from oil and/or gas extraction processes, flowback water, and/or wastewater. For example, one desalination method involves the use of humidification-dehumidification (HDH) processes, which involve contacting a solution containing a dissolved salt with a carrier gas in a humidifier, such that the carrier gas becomes heated and humidified. The heated and humidified gas is then brought into contact with cold water in a dehumidifier, thereby producing water with a reduced salt content.

As the world's population expands, the accompanying increase in demand for fresh water has led to fresh water shortages in many regions of the world. Desalination, including humidification-dehumidification-based desalination, could potentially play a role in mitigating such shortages. Accordingly, improved desalination systems and methods are desirable.

SUMMARY

Systems and methods for the removal of scale in humidification-dehumidification desalination apparatuses are generally described. The subject matter of the present invention involves, in some cases, interrelated products, alternative solutions to a particular problem, and/or a plurality of different uses of one or more systems and/or articles.

Certain aspects are related to methods for removing scale from a heat exchanger of a humidification-dehumidification desalination apparatus. In some embodiments, the method comprises transporting a liquid composition comprising a multidentate ligand from a source of the liquid composition through a fluidic pathway of the heat exchanger to at least partially remove the scale from the heat exchanger, the fluidic pathway of the heat exchanger fluidically connected to an inlet of a humidifier of the humidification-dehumidification desalination apparatus, the humidifier of the humidification-dehumidification desalination apparatus being fluidically connected to a dehumidifier of the humidification-dehumidification desalination apparatus. In some such embodiments, the method comprises, during at least a portion of time during which the liquid composition is transported through the fluidic pathway of the heat exchanger, determining a measure indicative of an amount of the multidentate ligand that remains active within the liquid composition, and adjusting at least one of a flow rate of the liquid composition and a level of active multidentate ligand within the liquid composition based at least in part upon the determination of the measure indicative of the amount of the multidentate ligand that remains active within the liquid composition. Some such embodiments comprise recycling at least a portion of the liquid composition from the fluidic pathway of the heat exchanger back to the source of the liquid composition. In some such embodiments, during at least a portion of the time during which the liquid composition is transported through the fluidic pathway of the heat exchanger, heat is transferred to at least a portion of the liquid composition, and the heat transferred to the portion of liquid composition originates from at least one of a second fluidic pathway of the heat exchanger, and a second heat exchanger, the second heat exchanger fluidically connected to the dehumidifier of the humidification-dehumidification desalination apparatus.

In some embodiments, the method comprises transporting a liquid composition comprising a multidentate ligand from a source of the liquid composition through a fluidic pathway of the heat exchanger to at least partially remove the scale from the heat exchanger, the fluidic pathway of the heat exchanger fluidically connected to an inlet of a humidifier of the humidification-dehumidification desalination apparatus, the humidifier of the humidification-dehumidification desalination apparatus being fluidically connected to a dehumidifier of the humidification-dehumidification desalination apparatus. In some such embodiments, the method comprises, during at least a portion of time during which the liquid composition is transported through the fluidic pathway of the heat exchanger, determining a measure indicative of an amount of the multidentate ligand that remains active within the liquid composition, and adjusting at least one of a flow rate of the liquid composition and a level of active multidentate ligand within the liquid composition based at least in part upon the determination of the measure indicative of the amount of the multidentate ligand that remains active within the liquid composition.

According to certain embodiments, the method comprises transporting a liquid composition comprising a multidentate ligand from a source of the liquid composition through a fluidic pathway of the heat exchanger to at least partially remove the scale from the heat exchanger, the fluidic pathway of the heat exchanger fluidically connected to an inlet of a humidifier of the humidification-dehumidification desalination apparatus, the humidifier of the humidification-dehumidification desalination apparatus being fluidically connected to a dehumidifier of the humidification-dehumidification desalination apparatus. In some such embodiments, during at least a portion of the time during which the liquid composition is transported through the fluidic pathway of the heat exchanger, heat is transferred to at least a portion of the liquid composition, and the heat transferred to the portion of the liquid composition originates from at least one of a second fluidic pathway of the heat exchanger, and a second heat exchanger, the second heat exchanger fluidically connected to the dehumidifier of the humidification-dehumidification desalination apparatus.

Other advantages and novel features of the present invention will become apparent from the following detailed description of various non-limiting embodiments of the invention when considered in conjunction with the accompanying FIGURES. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying FIGURES, which are schematic and are not intended to be drawn to scale. In the FIGURES, each identical or nearly identical component illustrated is typically represented by a single numeral. For purposes of clarity, not every component is labeled in every FIGURE, nor is every component of each embodiment of the invention shown where illustration is not necessary to allow those of ordinary skill in the art to understand the invention. In the FIGURES:

FIG. 1 is an exemplary schematic illustration of a water treatment system, according to certain embodiments.

DETAILED DESCRIPTION

Systems and methods for the removal of scale in humidification-dehumidification desalination apparatuses are generally described. According to certain embodiments, one or more multidentate ligands are used to at least partially remove scale from a heat exchanger fluidically connected to a humidifier of a humidification-dehumidification desalination apparatus. The multidentate ligand may, in some instances, originate from a source that is fluidically connected to the heat exchanger from which scale is removed using the multidentate ligand. Fluidic connections between the source and the heat exchanger may, according to certain embodiments, establish a continuous flow pathway along which a de-scaling composition can be recirculated.

Certain embodiments are related to determining one or more measures indicative of an amount of multidentate ligand that remains active in the liquid composition used to remove scale from the heat exchanger, and adjusting one or more properties of the liquid composition (e.g., a flow rate, an amount of active multidentate ligand within the liquid composition) based at least in part on the determination. According to some such embodiments, the activity of the multidentate ligand in the liquid composition can be monitored, and appropriate adjustments may be made to ensure that there is sufficient active multidentate ligand in the liquid composition to effectively remove scale from the heat exchanger.

According to some embodiments, the temperature of the liquid composition used to remove scale from the heat exchanger may be raised using heat from a second fluidic pathway of the heat exchanger from which scale is being removed and/or from a second heat exchanger fluidically connected to the dehumidifier of the humidification-dehumidification desalination apparatus. In one set of embodiments, the cleaning process can be performed relatively soon after a desalination step is performed, and the heat remaining in the second fluidic pathway of the heat exchanger can be used to heat the de-scaling liquid. According to some such embodiments, the amount of heat that must be generated to perform the scale removal step may be reduced, relative to situations in which the liquid composition is pre-heated using a separate, standalone unit (e.g., a boiler or other heater).

FIG. 1 is an exemplary schematic illustration of water treatment system 100, which can be used to produce a recovered water stream from an aqueous solution containing at least one dissolved salt. In certain embodiments, the water treatment system comprises a humidification-dehumidification (HDH) desalination apparatus. The HDH desalination apparatus can be configured to perform a desalination process in which water is removed from an aqueous stream containing at least one dissolved salt (e.g., a dissolved monovalent salt) received by the desalination apparatus to produce a concentrated stream enriched in the at least one dissolved salt (e.g., enriched in a dissolved monovalent salt) relative to the aqueous stream received by the desalination apparatus. Operation of the water treatment system can also include a cleaning process, which can be performed after a desalination process. The cleaning process comprises, according to certain embodiments, at least partially removing scale from a heat exchanger of the HDH desalination apparatus. For example, in some embodiments, scale may accumulate within the heat exchanger of the HDH desalination apparatus during the desalination process, after which the cleaning process may be used to at least partially remove scale from a surface of the heat exchanger. The de-scaling liquid may be used to at least partially remove scale from a heat transfer surface and/or any other solid surface of the heat exchanger.

The HDH desalination apparatus generally comprises a humidifier, a dehumidifier, and a heat exchanger. Referring to FIG. 1, for example, water treatment system 100 comprises an HDH desalination apparatus comprising humidifier 102, dehumidifier 104, and heat exchangers 106 and 108. While two heat exchangers are illustrated in the HDH desalination apparatus illustrated in FIG. 1, it should be understood that multiple heat exchangers are not required, and in certain embodiments, only heat exchanger 106 may be present, only heat exchanger 108 may be present, or both heat exchangers 106 and 108 may be replaced by another heat exchanger. In addition, while the humidifier, the dehumidifier, and the heat exchangers are illustrated as being separate, distinct units in FIG. 1, it should be understood that two or more (or all) of these units can be integrated within a single housing, in some embodiments.

According to certain embodiments, the HDH desalination apparatus may be used to perform a desalination process. In some embodiments, the desalination process comprises transporting an aqueous stream containing at least one dissolved salt through a fluidic pathway of a heat exchanger of the HDH desalination apparatus and subsequently through the humidifier of the HDH desalination apparatus. For example, referring to FIG. 1, in some embodiments, the desalination process comprises transporting aqueous stream 110 (which contains at least one dissolved salt) through fluidic pathway 112 of heat exchanger 106 and/or through fluidic pathway 114 of heat exchanger 108 and subsequently through humidifier 102. In some such embodiments, during the desalination process, at least a portion of the water from the aqueous stream is evaporated, within the humidifier, from the aqueous stream to produce a concentrated stream enriched in at least one dissolved salt relative to the aqueous stream transported to the humidifier. For example, referring to FIG. 1, in some embodiments, during the desalination process, at least a portion of the water from aqueous stream 110 is evaporated, within humidifier 102, from aqueous stream 110 to produce concentrated stream 116, which is enriched in at least one of the dissolved salts contained in aqueous stream 110 relative to aqueous stream 110.

In certain embodiments, during the desalination process, a humidified gaseous stream can also be produced. For example, referring to FIG. 1, during the desalination process, at least a portion of the water from aqueous stream 110 can be evaporated, within humidifier 102, from aqueous stream 110 to produce humidified gaseous stream 118. In some embodiments, the humidifier can be configured to receive a gaseous stream during the desalination process. For example, in FIG. 1, humidifier 102 can be configured to receive gaseous stream 119 during the desalination process. The gaseous stream may comprise, for example, any gas capable of carrying water vapor. For example, gaseous stream 119 may comprise air, nitrogen, oxygen, a noble gas (e.g., helium, argon, etc.), and/or any other suitable gas. In some embodiments, humidifier 102 can be configured such that water is evaporated from aqueous stream 110 into gaseous 119 to produce humidified gaseous stream 118 and concentrated stream 116 (which can contain at least a portion of stream 110 that is not evaporated into gaseous stream 119 to created humidified gaseous stream 118) during the desalination process.

The humidifier may have any configuration that allows for the transfer of water from the desalination feed stream to the gaseous stream. In certain embodiments, the humidifier comprises a vessel (e.g., a stainless steel tank or other vessel). The humidifier vessel can comprise a first inlet configured to receive an aqueous feed stream (e.g., aqueous feed stream 110 in FIG. 1) and a second inlet configured to receive a gaseous stream into which water from the aqueous feed stream is evaporated (e.g., stream 119 in FIG. 1).

In some embodiments, the humidifier comprises a device configured to produce droplets of the aqueous salt-containing stream when the aqueous salt-containing stream is transported through the device. For example, a nozzle, a notched trough distributor, or other spraying device may be positioned at the top of the humidifier such that the aqueous feed stream is distributed as droplets (e.g., sprayed) downward to the bottom of the humidifier. The use of a liquid distribution device (e.g., a spraying device) can increase the degree of contact between the aqueous salt-containing stream fed to the humidifier and the gaseous stream into which water from the aqueous salt-containing stream is transported during the desalination process. In some such embodiments, the gaseous stream can be transported in a counter-current direction, relative to the direction along which the aqueous salt-containing stream is transported. For example, the gaseous stream may be transported into the bottom of the humidifier, through the humidifier vessel, and out of the top of the humidifier. In certain embodiments, the remaining portion of water that is not transported from the aqueous salt-containing feed stream to the gaseous stream is collected at or near the bottom of the humidifier and transported out of the humidifier (and out of the water treatment system) as a concentrated salt-containing stream (e.g., stream 116 in FIG. 1).

In certain embodiments, the humidifier may be heated before and/or during the humidification step of the desalination process. Heating the humidifier (and/or a stream transported into the humidifier, as discussed in more detail below) may increase the degree to which water is transferred from the aqueous salt-containing feed stream to the gaseous stream within the humidifier during the desalination process. According to certain embodiments, the heating may be performed using a heater.

While a single humidifier unit is illustrated in FIG. 1, it should be understood that the humidifier could also include multiple humidifier units fluidically connected in parallel or in series. The humidifier may be of any size, which will generally depend upon the number of humidifier units employed in the system and the total flow rate of aqueous solution that is to be desalinated during the desalination process. In certain embodiments, the total of the volumes of the humidifiers used in the water treatment system can be at least about 1 liter, at least about 10 liters, or at least about 100 liters (and/or, in some embodiments, up to about 1,000,000 liters, or more).

In some embodiments, the humidifier contains a packing. The packing can facilitate enhanced direct contact between the aqueous salt-containing stream and the gaseous stream within the humidifier during the desalination process. The packing within the humidifier can be of any suitable type. In some embodiments, the packing comprises pellets (e.g., polyvinyl chloride (PVC) packing material, glass-filled polypropylene packing material, or other similar materials), mesh (e.g., wire mesh), shavings (e.g., wood shavings), plates, trays, and/or rings (e.g., Raschig rings). According to certain embodiments, the packing can be configured to be removable from the humidifier. That is to say, the packing material can be configured such that it may be separated from the humidifier without permanently damaging the humidifier and the packing. As one particular example, particles, shavings, rings, and the like can be loaded into the humidifier vessel such that, after use, removal of the packing can be achieved without destroying the packing or damaging the walls of the humidifier vessel. As another example, use of mesh, trays, plates, and the like can involve, in some embodiments, sliding the mesh, trays, and/or plates into the humidifier vessel (e.g., using a friction fitting) and/or by screwing the mesh, trays, and/or plates into the humidifier vessel.

The HDH desalination apparatus also generally comprises a dehumidifier fluidically connected to the humidifier of the HDH desalination apparatus. The dehumidifier of the HDH desalination apparatus can be configured to condense at least a portion of the water from the gaseous stream produced by the humidifier to produce a water-containing stream and a dehumidified gaseous stream. Accordingly, the desalination process may comprise, according to certain embodiments, condensing, within the dehumidifier of the HDH desalination apparatus, water from the humidified gaseous stream to produce a water-containing stream and a dehumidified gaseous stream (e.g., after transporting at least a portion of the humidified gaseous stream from the humidifier to the dehumidifier). For example, referring to FIG. 1, all or part of humidified gaseous stream 118 can be transported from humidifier 102 to dehumidifier 104, and water can be condensed within dehumidifier 104 to form water-containing stream 120 and dehumidified gaseous stream 122 during the desalination process. Accordingly, certain embodiments of the desalination process comprise condensing, within dehumidifier 104, water from humidified gaseous stream 118 to produce water-containing stream 120 and dehumidified gaseous stream 122.

According to certain embodiments, the water-containing stream from the dehumidifier contains a lower concentration of the dissolved salt (e.g., dissolved monovalent salt) than the aqueous stream fed to the humidifier of the HDH desalination apparatus during the desalination process. For example, in FIG. 1, dehumidifier 104 can be configured to produce water-containing stream 120, which can contain less of a dissolved salt (e.g., less of a dissolved monovalent salt) than aqueous stream 110 fed to humidifier 102.

In certain embodiments, the dehumidifier is directly fluidically connected to the humidifier. For example, in FIG. 1, dehumidifier 104 is directly fluidically connected (via stream 118) to humidifier 102. In other embodiments, the humidifier and dehumidifier can be arranged such that they are fluidically connected to each other but are not directly fluidically connected to each other.

In certain embodiments, at least a portion of the dehumidified gaseous stream produced by the dehumidifier during the desalination process can be recycled to the humidifier, for example, in a closed loop. The recycled dehumidified gaseous stream may be used to remove water from the aqueous solution fed to the humidifier, according to some such embodiments. For example, referring to FIG. 1, in some embodiments, all or a portion of dehumidified gaseous stream 122 can be used as gaseous stream 119, which can be transported to humidifier 102 and used to form at least a portion of humidified gaseous stream 118 during the desalination process. It should be understood that recycling the dehumidified gaseous stream back to the humidifier is an optional step, and in certain embodiments, the dehumidified gaseous stream is not necessarily recycled back to the humidifier. In some embodiments, all or a portion of the dehumidified stream from the dehumidifier can be transported elsewhere within the system and/or vented.

The dehumidifier may have any configuration that allows for the condensation of water from the vapor-containing gaseous stream fed to the dehumidifier. In certain embodiments, the dehumidifier comprises a vessel (e.g., a stainless steel tank or other vessel). The dehumidifier vessel can comprise a first inlet configured to receive a water-vapor-containing gaseous feed stream (e.g., humidified gaseous stream 118 in FIG. 1) during the desalination process. The dehumidifier vessel can comprise a first outlet configured to output a dehumidified gaseous stream (e.g., gaseous stream 122 in FIG. 1) and a second outlet configured to output a water-containing stream containing a relatively high percentage of water (e.g., water-containing stream 120 in FIG. 1) during the desalination process.

In certain embodiments, a relatively cool water-containing stream can be transported into the dehumidifier during the desalination process. The relatively cool water-containing stream transported into the dehumidifier can act as a cooling source, which can cause condensation of water vapor from the humidified gaseous stream after it has been transported to the dehumidifier. For example, referring to FIG. 1, stream 124 can correspond to a relatively cool water-containing stream. Stream 124 can be transported to dehumidifier 104. The relatively low temperature of stream 124 can act as a source of cooling for dehumidifier 104, and can cause condensation of condensable water vapor from humidified gaseous stream 118. In some embodiments, water from stream 124 can be combined with condensed water (from water vapor in humidified gaseous stream 118) and subsequently transported out of the dehumidifier via stream 120. In certain embodiments, latent and/or sensible heat from condensation of water vapor from and/or cooling of humidified gaseous stream 118 can be removed from dehumidifier 104 via stream 120.

In some embodiments, and as described in more detail below, heat can be recovered from stream 120 during the desalination process using optional heat exchanger 108. In some embodiments, after this heat recovery step, at least a portion of the water within stream 120 is removed from the desalination apparatus during the desalination process as a relatively pure water-containing stream (e.g., via stream 126 in FIG. 1). In certain embodiments, the amount of relatively pure water product that is removed from the desalination apparatus (e.g., via stream 126) during the desalination process is substantially equal to (e.g., within 5 wt % of) the amount of water condensed from humidified gaseous stream 118 within dehumidifier 104 during the desalination process.

In certain embodiments, at least a portion of stream 120 is recycled back to dehumidifier 104. For example, in FIG. 1, at least a portion of stream 120 can be recycled back to and mixed with stream 124 via stream 128. Such recycling can be performed, for example, to provide cooling to the dehumidifier. In certain embodiments, stream 128 is directly recycled to stream 124 without additional cooling. In other embodiments, stream 128 can be cooled prior to being mixed with stream 124. In some embodiments, no additional water is added to the water stream recycled from the outlet of the dehumidifier back to the inlet of the dehumidifier. For example, referring to FIG. 1, in some embodiments, stream 124 is not present, and stream 128 is transported directly to dehumidifier 104 without adding additional water. In other embodiments, there is no recycling of water back to the dehumidifier. For example, referring to FIG. 1, in some embodiments, stream 128 is not present, and only stream 124 is used.

In certain embodiments, the dehumidifier is configured such that the gaseous stream directly contacts a liquid within the dehumidifier during the desalination process. In some embodiments, the humidifier is configured such that the gaseous stream directly contacts the aqueous liquid feed stream within the humidifier. Configuring the humidifier and/or the dehumidifier such that direct contact between the gaseous stream and the liquid stream (e.g., the condensed liquid stream in the case of the dehumidifier, and the aqueous feed stream in the case of the humidifier) is maintained can be, in some embodiments, advantageous, as heat transfer to the gaseous phase may be enhanced in some such embodiments. Such arrangements can lead to more energy efficient condensation of the water vapor from the gaseous phase in the dehumidifier and/or more energy efficient evaporation of water vapor from the aqueous feed stream within the humidifier.

In certain embodiments, the dehumidifier comprises a bubble column condenser. Referring to FIG. 1, for example, humidified gaseous stream 118 from humidifier 102 may be transported to the bottom of dehumidifier 104, after which, the contents of stream 118 may be contacted with a condensed liquid at the bottom of dehumidifier 104. As the contents of humidified gaseous stream 118 are transported through the liquid within dehumidifier 104, at least a portion of the water vapor may be condensed and held at the bottom of the dehumidifier. Condensed water at the bottom of the dehumidifier may be transported out of the dehumidifier via water-containing stream 120, and dehumidified gas may be transported out of the top of dehumidifier via stream 122.

The dehumidifier can comprise a single stage in which liquid and vapor-containing gas are contacted or multiple stages on which liquid and vapor-containing gas are contacted. Each stage of the bubble-column condenser may comprise a bubble generator, such as a sieve plate, at the bottom of the stage. During operation, the condensed liquid may collect above the bubble generator, and the humidified gaseous stream may be bubbled through the condensed liquid by passing the gaseous stream through the bubble generator.

In certain embodiments in which multiple-stage bubble column condensers are employed as dehumidifiers, the inlet of the first stage can be coupled to the vapor-containing gas source and the outlet of the first stage can be coupled to the inlet of the second stage. Additional stages can be arranged such that outlets of a preceding stage are fluidically coupled to inlets of a subsequent stage, and the outlet of the final stage can be used as the outlet of the condenser (e.g., from which gaseous stream 122 originates in FIG. 1).

Suitable bubble-column condensers that may be used as the dehumidifiers in certain systems and methods described herein include those described in U.S. Patent Publication No. 2013/0075940, by Govindan et al., filed Jul. 12, 2012 as U.S. patent application Ser. No. 13/548,166, and entitled "Bubble-Column Vapor Mixture Condenser"; U.S. Patent Publication No. 2015/0129410, by Govindan et al., filed Sep. 12, 2014 as U.S. patent application Ser. No. 14/485,606, and entitled "Systems Including a Condensing Apparatus Such as a Bubble Column Condenser"; and U.S. Patent Publication No. 2015/0083577, by Govindan et al., filed Sep. 23, 2014 as U.S. patent application Ser. No. 14/494,101, and entitled "Desalination Systems and Associated Methods," each of which is incorporated herein by reference in its entirety for all purposes.

While a single dehumidifier unit is illustrated in FIG. 1, it should be understood that the dehumidifier could also include multiple dehumidifier units fluidically connected in parallel or in series. The dehumidifier may be of any size, which will generally depend upon the number of dehumidifier units employed in the water treatment system and the total flow rate of aqueous solution that is to be desalinated. In certain embodiments, the total of the volumes of the dehumidifiers used in the water treatment system can be at least about 1 liter, at least about 10 liters, or at least about 100 liters (and/or, in some embodiments, up to about 1,000,000 liters, or more).

As noted above, the HDH desalination apparatus can comprise at least one heat exchanger. The heat exchanger comprises, in some embodiments, a fluidic pathway fluidically connected to an inlet of the humidifier of the HDH desalination apparatus. For example, in FIG. 1, heat exchanger 106 comprises fluidic pathway 112, which is fluidically connected to an inlet of humidifier 102 via stream 110. The HDH desalination apparatus in FIG. 1 also comprises heat exchanger 108, which comprises fluidic pathway 114 fluidically connected to an inlet of humidifier 102 via stream 110. As noted above, while two heat exchangers are illustrated in the HDH desalination apparatus illustrated in FIG. 1, it should be understood that multiple heat exchangers are not required, and in certain embodiments, only heat exchanger 106 may be present, only heat exchanger 108 may be present, or both heat exchangers 106 and 108 may be replaced by another heat exchanger.

In certain embodiments, the heat exchanger can be used to heat the salt-containing stream (e.g., stream 110 in FIG. 1) before it is transported to the humidifier of the HDH desalination apparatus during the desalination process. Heating the salt-containing stream can, according to certain embodiments, increase the degree to which water is transferred from the aqueous feed stream to the gaseous stream within the humidifier.

The heat exchanger(s) of the HDH desalination apparatus may be configured, in some embodiments, to transfer heat from a heat exchanger stream to the aqueous salt-containing feed stream (e.g., to stream 110 in FIG. 1). In some such embodiments, at least one heat exchanger can be used to transfer heat from a liquid stream to the aqueous salt-containing feed stream before the aqueous salt-containing feed stream is fed to the humidifier during the desalination process. For example, in some embodiments, the HDH desalination apparatus of the water treatment system comprises a heat exchanger used to transfer heat from a liquid heated by a source of heat outside the desalination apparatus (such as a boiler) to the aqueous feed stream during the desalination process. As one example, the HDH desalination apparatus in FIG. 1 includes heat exchanger 106, which can be used to transfer heat from liquid stream 130 to aqueous salt-containing feed stream 110 before stream 110 is fed to humidifier 102. Liquid stream 130 can be heated, for example, using a boiler or any other suitable heat source apart from the humidifier or dehumidifier (or any other part of) HDH desalination apparatus. Generally, streams 110 and 130 (and fluidic pathways 112 and 140) are kept fluidically isolated from each other within heat exchanger 106, such that the contents of the streams are not mixed, but heat is transferred between them.

In some embodiments, the HDH desalination apparatus of the water treatment system comprises a heat exchanger configured to transfer heat from a liquid heated by a source of heat within the HDH desalination apparatus (e.g., a liquid heated by the dehumidifier of the HDH desalination apparatus) to the aqueous salt-containing feed stream during the desalination process. For example, the HDH desalination apparatus in FIG. 1 includes optional heat exchanger 108, which can be used to transfer heat from dehumidifier 104 to aqueous salt-containing stream 110 (via water containing stream 120) before stream 110 is fed to humidifier 102. The water within water containing stream 120 may be heated, for example, due to the latent heat of condensation associated with condensing water within gaseous stream 118 in dehumidifier 104. Optional heat exchanger 108 can thus be used, according to certain embodiments, to recover heat that would otherwise be lost from the HDH desalination apparatus. Generally, stream 110 and stream 120 (and fluidic pathways 114 and 142) are kept fluidically isolated from each other within heat exchanger 108, such that the contents of the streams are not mixed, but heat is transferred between them.

According to certain embodiments, a first heat exchanger is used to transfer heat from a heat source within the HDH desalination apparatus (e.g., from the dehumidifier of the HDH desalination apparatus) to the aqueous salt-containing feed stream and, subsequently, a second heat exchanger is used to transfer heat from a heat source outside the HDH desalination apparatus (e.g., outside the dehumidifier of the HDH desalination apparatus) to the aqueous salt-containing feed stream during the desalination process. For example, in FIG. 1, stream 110 is transported to first heat exchanger 108, which is used to transfer heat from a heat source within the HDH desalination apparatus (e.g., dehumidifier 104) to aqueous feed stream 110 (via stream 120). Subsequently, stream 110 is transported to second heat exchanger 106, which is used to transfer heat from a heat source outside the desalination apparatus to aqueous feed stream 110 via stream 130. Again, as noted above, while two heat exchangers are illustrated in the HDH desalination apparatus illustrated in FIG. 1, it should be understood that multiple heat exchangers are not required, and in certain embodiments, only heat exchanger 106 may be present, only heat exchanger 108 may be present, or both heat exchangers 106 and 108 may be replaced by another heat exchanger.

In certain embodiments, the heat exchanger(s) used to transfer heat from a first liquid to the aqueous salt-containing feed stream is directly fluidically connected to the humidifier. For example, in FIG. 1, heat exchanger 106 can, in some embodiments, be configured and/or operated such that it is directly fluidically connected to humidifier 102. In some embodiments, heat exchanger 108 can be configured and/or operated such that it is directly fluidically connected to humidifier 102.

In some embodiments, no component of the aqueous salt-containing feed stream changes in relative abundance by more than 5% between the humidifier and the heat exchanger(s) used to transfer heat from a first liquid to the aqueous salt-containing feed stream during the desalination process. For example, in FIG. 1, heat exchanger 106 and humidifier 102 can be arranged and/or operated, according to some embodiments, such that no component of stream 110 changes in relative abundance by more than 5% between heat exchanger 106 and humidifier 102. Similarly, referring to FIG. 1, heat exchanger 108 and humidifier 102 can be arranged and/or operated, according to certain embodiments, such that no component of stream 110 changes in relative abundance by more than 5% between heat exchanger 108 and humidifier 102.

Any heat exchanger known in the art may be used to perform the heat transfer operations described herein. In some embodiments, the heat exchanger may be a liquid-to-liquid heat exchanger (i.e., the heat exchanger may be used to transfer heat from one liquid to another liquid). Examples of suitable heat exchangers include, but are not limited to, shell and tube heat exchangers, tube and tube heat exchangers, plate heat exchangers, plate and shell heat exchangers, and plate and frame heat exchangers.

The stream fed to the HDH desalination apparatus during the desalination process contains, in certain embodiments, at least one dissolved monovalent salt. In some such embodiments, the HDH desalination apparatus can be configured to remove water from an aqueous stream to produce a concentrated stream that is enriched in at least one dissolved monovalent salt relative to the aqueous stream received by the HDH desalination apparatus. In FIG. 1, for example and as noted above, the HDH desalination apparatus in water treatment system 100 can be configured to remove water from aqueous stream 110 to produce stream 116. In some such embodiments, stream 116 can be enriched in at least one dissolved monovalent salt contained within stream 110, relative to stream 110. A dissolved salt is a salt that has been solubilized to such an extent that the component ions of the salt are no longer ionically bonded to each other. Generally, the term "monovalent salt" refers to a salt that includes a monovalent cation (i.e., a cation with a redox state of +1 when solubilized). Examples of monovalent salts include, but are not limited to, those containing sodium, potassium, lithium, rubidium, cesium, and francium. In certain embodiments, the monovalent salts include monovalent anions such as, for example, chlorine, bromine, fluorine, and iodine. Examples of monovalent salts include, but are not limited to, sodium chloride (NaCl), sodium bromide (NaBr), potassium chloride (KCl), potassium bromide (KBr), sodium carbonate ($Na_2CO_3$), sodium sulfate ($Na_2SO_4$), and the like.

The aqueous feed stream transported to the HDH desalination apparatus during the desalination process (e.g., stream 110 in FIG. 1) can originate from a variety of sources. For example, in certain embodiments, at least a portion of the stream fed to the HDH desalination apparatus during the desalination process comprises and/or is derived from seawater, ground water, brackish water, water from an oil and/or gas well, and/or the effluent of a chemical process (e.g., the effluent of another water treatment system (e.g., a water treatment system configured to perform desalination), or another chemical process).

One advantage associated with certain (although not necessarily all) of the inventive systems and methods described herein is that they can be used, in a desalination process, to process streams with relatively high concentrations of dissolved salts (e.g., relatively high concentrations of dissolved monovalent salts). For example, in some embodiments, the stream fed to the humidifier of the HDH desalination apparatus during the desalination process may contain dissolved salts (e.g., dissolved monovalent salts) in an amount of at least about 2 wt %, at least about 5 wt %, at least about 10 wt %, at least about 20 wt %, or at least about 25 wt % (and/or, in certain embodiments, up to the solubility limit).

According to certain embodiments, the concentrated stream enriched in the at least one dissolved salt produced by the HDH desalination apparatus during the desalination process (e.g., in stream 116) includes dissolved salts in relatively high amounts. For example, in some embodiments, the concentrated stream produced by the HDH desalination apparatus during the desalination process includes dissolved salts such that the concentrated stream has a density, at 60° F., of from about 9 pounds per gallon to about 11 pounds per gallon, from about 9.5 pounds per gallon to about 10.5 pounds per gallon, or from about 9.8 pounds per gallon to about 10.2 pounds per gallon. In some embodiments, the concentrated stream produced by the HDH desalination apparatus during the desalination process includes dissolved salts such that it has a density, at 60° F., of about 10 pounds per gallon.

In some embodiments, the HDH desalination apparatus is configured to produce a stream containing water of relatively high purity. For example, in some embodiments, the desalination apparatus produces a stream (e.g., water-containing stream 120 in FIG. 1) containing water in an amount of at least about 75 wt %, at least about 85 wt %, at least about 95 wt %, at least about 99 wt %, at least about 99.9 wt %, or at least about 99.99 wt % (and/or, in certain embodiments, up to about 99.999 wt %, or more).

It should be understood that the "desalination process" described above (and elsewhere herein) does not necessarily result in the production of a stream of pure water (although, in some embodiments, pure or substantially pure water may be produced during a desalination process), and that, in some cases, the desalination process may involve only the partial separation of salt and water such that the water-containing stream (e.g., stream 120 in FIG. 1) also includes dissolved salt.

In some instances, scale (e.g., hard scale and/or soft scale) can form on one or more surfaces of the desalination apparatus during the desalination process. Scale formation is a phenomenon known in the art. Generally, scale formation involves the formation of solid salts ("scale") on a surface that has a different chemical composition than the scale, and which surface is not transported along with the fluid from which the scale is deposited. For example, the deposition of solid salts from a fluid flowing through a heat exchanger on a wall of the heat exchanger that remains contained within the heat exchanger during operation of the heat exchanger would be considered scale formation. On the other hand, the formation of solid salts on suspended solids that are transported into and out of the heat exchanger during operation of the heat exchanger would not be considered scale formation.

The formation of scale within the heat exchanger(s) of the HDH desalination apparatus can involve the formation of any of a number of types of scale. In some embodiments, the scale that is formed on the heat exchanger(s) during the desalination process comprises a salt comprising at least one of $Mg^{2+}$, $Ca^{2+}$, $Sr^{2+}$, and/or $Ba^{2+}$. In certain embodiments, the scale that is formed on the heat exchanger(s) during the desalination process comprises a salt comprising at least one of carbonate anions ($CO_3^{2-}$), bicarbonate anions ($HCO_3^-$), sulfate anions ($SO_4^{2-}$), bisulfate anions ($HSO_4^-$), dissolved silica (e.g., $SiO_2(OH)_2^{2-}$, $SiO(OH)^{3-}$, $(SiO_3^{2-})_n$, and the like), and hydroxide ions ($OH^-$). In some embodiments, the scale that is formed on the heat exchanger(s) during the desalination process is a salt comprising at least one of $Mg^{2+}$, $Ca^{2+}$, $Sr^{2+}$, and/or $Ba^{2+}$ and at least one of carbonate anions ($CO_3^{2-}$), bicarbonate anions ($HCO_3^-$), sulfate anions ($SO_4^{2-}$), bisulfate anions ($HSO_4^-$), and dissolved silica (e.g., $SiO_2(OH)_2^{2-}$, $SiO(OH)^{3-}$, $(SiO_3^{2-})_n$). In some embodiments, the scale that is formed on the heat exchanger(s) during the desalination process comprises a salt comprising at least one of $Mg^{2+}$, $Ca^{2+}$, $Sr^{2+}$, and/or $Ba^{2+}$ and at least one of carbonate anions ($CO_3^{2-}$), bicarbonate anions ($HCO_3^-$), sulfate anions ($SO_4^{2-}$), and bisulfate anions ($HSO_4^-$). In certain embodiments, the scale that is formed on the heat exchanger(s) during the desalination process comprises a salt comprising strontium (e.g., $Sr^{2+}$), such as strontium sulfate.

Generally, any surface of the desalination apparatus that contacts the salt-containing liquid during the desalination process is susceptible to scale formation. In certain instances (e.g., due to elevated surface temperatures and/or comparatively rough surfaces of the heat exchangers), scale is more likely to form on surfaces of the heat exchangers than on surfaces of other components of the desalination apparatus. The formation of scale (which is generally thermally insulating) on heat exchanger surfaces can have a relatively high impact on the efficiency of the desalination apparatus (relative to the impact of scale formation on surfaces within, for example, the humidifier). Thus, reducing the amount of scale present on the surfaces of the heat exchanger(s) in the desalination apparatus is generally desirable.

Scale formation may be facilitated by a variety of factors, such as temperature variations, flow rate variations, roughness of heat exchanger surfaces, and/or the presence co-precipitates, among others. When scaling ions are present in the water transferred through the heat exchanger, scaling can be very difficult to inhibit or prevent. As one non-limiting example, the precipitation concentration of strontium sulfate scale, in most situations, is substantially unaffected by temperature; however, if calcium carbonate is also present, the temperature-related formation of calcium carbonate scale may cause the precipitation of strontium sulfate at concentrations below which the strontium sulfate scale would normally be formed and/or at rates much faster than strontium sulfate scale would normally be formed. The mechanism behind this effect is believed to include co-precipitation, in which the formation of one crystalline structure creates energetically favorable conditions for the formation of another type and/or the generation of rough surfaces, which can seed the growth of another type of crystal structure.

Given the range of factors that facilitate scale formation, complete prevention of scaling is often impractical. For example, one could substantially reduce the formation of scale on heat exchanger surfaces by removing scale-forming ions from the salt-containing stream (e.g., via ion precipitation, water softening, etc.) prior to transporting the salt-containing stream to the heat exchanger(s). However, removing large amounts of scale-forming ions in pre-treatment steps is often prohibitively expensive.

Certain embodiments are related to systems and methods in which solid scale is removed from at least one surface of a heat exchanger of the desalination apparatus (e.g., heat exchanger 106 and/or heat exchanger 108 in FIG. 1) after it has been formed. Such scale may form, for example, during shutdown of the desalination process, for example, if super-saturated water remains quiescent in the heat exchanger for an extended period of time. In some such cases, the high velocities needed to prevent scaling are not present, and scale deposits from the stagnant aqueous solution.

The removal of scale from the surface(s) of the heat exchanger(s) can be part of a "cleaning process." The cleaning process can be performed, according to certain embodiments, after the desalination process (which may include any of the steps described above or elsewhere herein) has been performed. According to some embodiments, the cleaning process comprises transporting a liquid composition comprising a multidentate ligand from a source of the liquid composition through a fluidic pathway of the heat exchanger to at least partially remove the scale from the heat exchanger. In some such embodiments, scale on the surface of the heat exchanger(s) can be at least partially removed by exposing the scale to the liquid composition comprising the at least one multidentate ligand. In certain embodiments, the multidentate ligand and a cationic species within the scale on the solid surface form a coordination complex that is substantially soluble in the liquid composition. Without wishing to be bound by any particular theory, it is believed that the multidentate ligands can interact with ions already bonded in crystalline structures of the scale, and that this interaction can force the metal cation out of its existing structure and into a central position within the coordination complex, causing the scale to dissolve. After the multidentate ligand forms the coordination complex with the cationic species, the coordination complex can be dissolved in the liquid composition, and the scale can be removed from the solid surface of the heat exchanger. As one particular example, the strontium cation in strontium sulfate scale can be chelated using a multidentate ligand such as diethylenetriaminepentaacetic acid (DTPA). The chelated ions generally have a high solubility in water, and thus, will generally dissolve in an aqueous liquid composition. After dissolving in the liquid composition, the dissolved complexes can be transported away by purging the liquid composition from the heat exchanger.

The liquid composition used to at least partially remove scale from the surface(s) of the heat exchanger(s) is also sometimes referred to herein as a "de-scaling liquid," and the process of at least partially removing scale from a heat exchanger(s) is sometimes referred to herein as "de-scaling." It should be understood that the use of the phrases "de-scaling" and "de-scaling liquid" are not meant to imply that complete removal of all scale from the surface(s) of the heat exchanger(s) is necessarily achieved (although, in some embodiments, complete or substantially complete removal of scale from the heat exchanger(s) can be achieved), and that, in some cases, the de-scaling liquid can be used to perform a de-scaling operation such that only a portion of the scale is removed from the surface(s) of the heat exchanger(s).

Any multidentate ligand that can form a complex with one or more ions of a scale-forming salt can be used in the liquid composition used to remove scale from the heat exchanger(s). The term "multidentate ligand," as used herein, refers to a ligand that is capable of forming a coordination complex with a central ion such that multiple parts of the ligand molecule interact with the central ion of the coordination complex. Those of ordinary skill in the art are familiar with the concept of multidenticity in the context of ligands. Multidentate ligands are sometimes also referred to by those of ordinary skill in the art as multivalent ligands. In some embodiments, the multidentate ligand can comprise a bidentate ligand (i.e., a ligand with two parts that each interact with the central ion in a coordination complex), a tridentate ligand (i.e., a ligand with three parts that each interact with the central ion in a coordination complex), a tetradentate ligand (i.e., a ligand with four parts that each interact with the central ion in a coordination complex), a pentadentate ligand (i.e., a ligand with five parts that each interact with the central ion in a coordination complex), a hexadentate ligand (i.e., a ligand with six parts that each interact with the central ion in a coordination complex), a heptadentate ligand (i.e., a ligand with seven parts that each interact with the central ion in a coordination complex), and/or an octadentate ligand (i.e., a ligand with eight parts that each interact with the central ion in a coordination complex). Examples of multidentate ligands that can be used include, but are not limited to, triphosphate; nitrilotriacetic acid (NTA); inosine triphosphate; 3,4-dihydroxybenzoic acid; uridine triphosphate; ATP; citric acid; oxalic acid; ADP; kojic acid; trimetaphosphate; maleic acid; globulin; casein; albumin; adipic acid; fumaric acid; malic acid; (+)-tartaric acid; glutamic acid; citraconic acid; itaconic acid; succinic acid; aspartic acid; glutaric acid; ethylenediaminetetraacetic acid (EDTA); and diethylenetriaminepentaacetic acid (DTPA).

In certain embodiments, the liquid composition used to remove scale from the heat exchanger(s) comprises diethylenetriaminepentaacetic acid (DTPA). DTPA can be a strong chelant, and has been observed to form coordinated complexes with strengths up to 100 times greater than the strengths of those formed using EDTA. Without wishing to be bound by any particular theory, it is believed that the strength of DTPA as a chelating agent may be due to its unusually high denticity. For example, at high pH values, DTPA can become a penta-anion, $DTPA^{5-}$, and it is believed that each of the DTPA anion's three nitrogen centers and five $COO^-$ groups can act as a center for coordination, making DTPA an octadentate ligand.

In some embodiments, the de-scaling liquid contains multidentate ligand(s) in an amount of at least about 10 wt %, at least about 20 wt %, at least about 30 wt %, at least about 40 wt %, at least about 45 wt %, at least about 50 wt %, or more. In certain embodiments, the de-scaling liquid contains multidentate ligand(s) in an amount of less than about 80 wt %, less than about 75 wt %, less than about 70 wt %, less than about 65 wt %, less than about 60 wt %, or less than about 55 wt %.

In some embodiments, the de-scaling liquid contains DTPA in an amount of at least about 10 wt %, at least about 20 wt %, at least about 30 wt %, at least about 40 wt %, or at least about 45 wt % (and/or in some embodiments, up to about 50 wt %, up to about 55 wt %, up to about 60 wt %, up to about 60 wt %, or more).

According to certain embodiments, the liquid composition used to remove scale from a solid surface of the heat exchanger comprises oxalate anions. Without wishing to be bound by any particular theory, it is believed that the combination of oxalate anions and at least one other multidentate ligand exhibit a synergy that allows the combination of these chemicals to remove much more scale than could be removed using either of the two chemicals alone. In particular, it is believed that, in some cases in which the oxalate anions have a geometry that is different from the geometry of the other multidentate ligand, the different molecular geometry exhibited by the oxalate anions may increase the rate of chelation/dissolution by interacting with scale ions that are not reachable by the other multidentate ligand or are reachable by the other multidentate ligand only to a limited degree.

According to certain embodiments, de-scaling can be achieved using a relatively low amount of oxalate anions. In some embodiments, the de-scaling liquid contains oxalate anions in an amount of at least about 0.5 wt %, at least about 1 wt %, at least about 2 wt %, at least about 3 wt %, at least about 4 wt %, or at least about 5 wt %. In some embodiments, the amount of oxalate anions in the de-scaling liquid can be less than about 20 wt %, less than about 15 wt %, or less than about 10 wt %.

In certain embodiments, the liquid composition used to remove scale from a solid surface of the water treatment system comprises oxalate anions and diethylenetriaminepentaacetic acid (DTPA). Without wishing to be bound by any particular theory, it is believed that the combination of oxalate anions and DTPA exhibit, in some instances, a particularly beneficial synergy that allows the combination of the two chemicals to remove much more scale than could be removed using either of the two chemicals alone.

In some embodiments, the liquid composition used to remove scale from solid surfaces has a basic pH. For example, in some embodiments, the liquid composition has a pH of at least about 8, at least about 10, at least about 12, or at least about 13 (and/or, in some embodiments, a pH of up to about 14, or higher). The pH of the liquid composition can be raised, according to certain embodiments, by adding hydroxide ions to the liquid composition. This can be achieved, for example, by dissolving one or more hydroxide salts (e.g., potassium hydroxide, sodium hydroxide, or any other suitable hydroxide salt) within the liquid composition.

It has also been found that the amount of water contained in the de-scaling liquid can also impact the rate at which the formation of coordination complexes occurs. Thus, in some embodiments, the de-scaling liquid is diluted with water. In some embodiments, the de-scaling liquid contains water in an amount of at least about 10 wt %, at least about 20 wt %, at least about 30 wt %, or at least about 35 wt % (and/or in some embodiments, up to about 40 wt %, up to about 45 wt %, up to about 50 wt %, or more).

The liquid compositions used to remove scale as described above can be used to remove any type of scale, including any of the scaling salts mentioned above or elsewhere herein (e.g., $BaSO_4$, $SrSO_4$, $BaCO_3$, and/or $SrCO_3$, and/or any of the scaling salts mentioned above or elsewhere herein). According to certain embodiments, the liquid composition is configured to remove scales that are most often formed when treating oilfield wastewaters, such as wastewater and produced water from hydraulic fracturing operations. In certain (although not necessarily all) embodiments, the liquid compositions used to remove scale can be especially effective in removing strontium-containing scale (e.g., salts containing $Sr^{2+}$ ions such as, for example, strontium carbonate, strontium bicarbonate, strontium sulfate, and strontium bisulfate).

According to certain embodiments, the cleaning process can remove "hard scale" which, as used herein, refers to precipitated sulfates and precipitated divalent cations such as calcium, magnesium, barium, and strontium. "Soft scale" (e.g., crystalline carbonate salts) can also be removed.

According to certain embodiments, the liquid composition used to at least partially remove the scale from the exchanger surface is transported to the desalination apparatus and a cleaning process performed separately from the desalination process (in which the HDH desalination apparatus is used to remove water from an aqueous feed stream containing at least one dissolved salt to produce a concentrated stream enriched in the at least one dissolved salt relative to the aqueous feed stream). For example, in the set of embodiments illustrated in FIG. 1, water treatment system 100 comprises source 132 of the liquid composition used to remove scale from the heat exchanger (which composition can comprise a multidentate ligand, as described above). The source of the liquid composition can be fluidically connected, directly or otherwise, to one or more heat exchangers within the HDH desalination apparatus. For example, in FIG. 1, source 132 is directly fluidically connected to fluidic pathway 114 of heat exchanger 108 via stream 136. Source 132 can also be directly fluidically connected to fluidic pathway 112 of heat exchanger 106.

In some embodiments, after a desalination process has been run using the desalination apparatus, the liquid composition used to at least partially remove scale can be transported through at least one heat exchanger of the desalination apparatus. For example, in FIG. 1, in some embodiments, after humidifier 102 and dehumidifier 104 have been used to perform a desalination process, de-scaling liquid can be transported, via stream 136, from source 132 through fluidic pathway 114 of heat exchanger 108 and/or through fluidic pathway 112 of heat exchanger 106. The de-scaling liquid from source 132 can be used to at least partially remove scale from fluidic pathway 114 of heat exchanger 108 and/or fluidic pathway 112 of heat exchanger 106.

Certain embodiments comprise, during the cleaning process, recycling at least a portion of the de-scaling liquid from the fluidic pathway of the heat exchanger back to the source of the de-scaling liquid. For example, in FIG. 1, at least a portion of the de-scaling liquid transported to the heat exchanger(s) can be recycled from fluidic pathway 114 of heat exchanger 108 and/or from fluidic pathway 112 of heat exchanger 106 back to source 132 via stream 134. In some embodiments, the de-scaling liquid used to at least partially remove scale from the heat exchanger(s) can be circulated through the heat exchanger(s), for example, until the cleaning process is finished and/or until the de-scaling liquid cannot dissolve any more scale. According to certain embodiments, fresh de-scaling liquid may be added to the de-scaling liquid stream to ensure that the liquid composition remains capable of effectively removing scale from the surface(s) of the heat exchanger(s), as described in more detail below.

While, in FIG. 1, the fluidic conduits between source 132 and heat exchangers 106 and 108 include a portion of the conduit that is also used to transport the salt-containing aqueous feed to humidifier 102 during the desalination process, the fluidic conduits between source 132 and heat exchangers can be separate from the desalination conduits, in some embodiments (although the cleaning process will generally be configured such that the de-scaling liquid contacts at least a portion of the fluidic pathways within the heat exchangers that are contacted by the desalination feed, such that those fluidic pathways may be at least partially de-scaled).

As noted above, in some embodiments, the liquid composition used to at least partially remove scale from the surface(s) of the heat exchanger(s) of the HDH desalination apparatus can be transported to the heat exchanger(s) as part of a cleaning process that is temporally separate from the desalination process. For example, in some embodiments, a desalination process is performed over a first period of time and, subsequently, over a second period of time that does not substantially overlap with the first period of time, a cleaning process can be performed in which at least a portion of the solid scale formed in the heat exchanger(s) of the HDH desalination apparatus during the desalination process is removed from the surface(s) of the heat exchanger(s). Two periods of time are said to not substantially overlap with each other when the total amount of time over which the two periods of time overlap is less than 5% of the shorter of the two periods of time. In some embodiments, two periods of time that do not substantially overlap with each other occur such that the total amount of time over which the two periods of time overlap is less than 2%, less than 1%, or less than 0.1% of the shorter of the two periods of time.

The cleaning process may be performed, according to certain embodiments, without disassembling the heat exchanger(s) that is cleaned. Cleaning the heat exchanger(s) without disassembling the heat exchanger(s) (also sometimes referred to as a "clean in place" cleaning process) can be advantageous in certain (although not necessarily all) cases, as it may reduce the amount of wear to which heat exchanger components (e.g., gaskets and other components that provide sealing in the heat exchanger) are exposed.

It should be understood that the "cleaning processes" described above do not necessarily result in complete removal of all scale from the surface(s) of the heat exchanger(s) (although, in some embodiments, complete or substantially complete removal of scale from the heat exchanger(s) can be achieved during a cleaning process), and that, in some cases, the cleaning process may involve only the partial removal of scale from the surface(s) of the heat exchanger(s).

In some embodiments, one or more adjustments to the cleaning process can be made based on the activity of the multidentate ligand within the de-scaling liquid. The adjustments may be made, according to certain embodiments, to ensure that an appropriate amount of active multidentate ligand remains in the de-scaling liquid to achieve a desired level of scale removal from the heat exchanger(s). A multidentate ligand is said to be "active" when it has not formed a coordination complex with a central ion. Thus, active multidentate ligands are generally available to form coordination complexes with scaling ions (e.g., from scale salts on the surface(s) of the heat exchanger(s)). On the other hand, a multidentate ligand is said to be "inactive" when it has formed a coordination complex with an ionic species.

According to certain embodiments, the cleaning process comprises—during at least a portion of time during which the liquid composition is transported through the fluidic pathway of the heat exchanger—determining a measure indicative of an amount of the multidentate ligand that remains active within the liquid composition, and adjusting at least one system parameter based at least in part upon the determination of the measure indicative of the amount of the multidentate ligand that remains active within the liquid composition. A variety of techniques can be employed to determine the measure indicative of the amount of multidentate ligand that remains active, including directly measuring the amount of active multidentate ligand and indirectly measuring the amount of active multidentate ligand (e.g., by directly or indirectly measuring the presence of another species indicative of the presence or absence of active multidentate ligand as described, for example, below).

In some embodiments, determining a measure indicative of an amount of the multidentate ligand that remains active comprises adding a cation to the liquid composition and subsequently determining a measure indicative of an amount of the cation that does not form a complex with the multidentate ligand. Determining a measure indicative of an amount of the cation that does not form a complex with the multidentate ligand comprises, according to certain embodiments, measuring an amount of the cation (e.g., a divalent cation such as $Ba^{2+}$ or $Ca^{2+}$) that remains dissociated within the liquid composition. The amount of cation that remains dissociated within the liquid composition can be determined, for example, by adding an indicator chemical (e.g., that changes color in the presence of solubilized cations such as calcium ions), by sampling the liquid composition and performing direct compositional analysis, or via any other suitable method. Examples of suitable indicator chemicals include, but are not limited to, Tetrahydroxyquinone, Hydroxynapthol Blue, Calmagite, Eriochrome Black T, and Calconcarboxylic acid. Solubilized ions (e.g., solubilized divalent cations such as solubilized calcium ions) can be measured, in some embodiments, using an ion-selective electrode, via colorimetry, and/or using inductively coupled plasma mass spectrometry.

In some embodiments, determining a measure indicative of an amount of the cation that does not form a complex with the multidentate ligand comprises adding a cation to the liquid composition and subsequently measuring an amount of the cation that has formed a complex with the multidentate ligand (which can be used, for example, to back calculate the amount of cation that has not formed a complex with the multidentate ligand). One can determine the amount of added cations (e.g., calcium ions) that form complexes with the multidentate ligand using, for example, inductively coupled mass spectrometry.

The above-described methods can be used in combination or in the alternative, in some embodiments. For example, according to certain embodiments, determining a measure indicative of an amount of the cation that does not form a complex with the multidentate ligand comprises adding the cation to the liquid composition and subsequently measuring both an amount of the cation that does not form a complex with the multidentate ligand and an amount of the cation that does form a complex with the multidentate ligand. In other embodiments, determining a measure indicative of an amount of the cation that does not form a complex with the multidentate ligand comprises adding the cation to the liquid composition and subsequently measuring an amount of the cation that does not form a complex with the multidentate ligand, but does not involve measuring an amount of the cation that does form a complex with the multidentate ligand. In still other embodiments, determining a measure indicative of an amount of the cation that does not form a complex with the multidentate ligand comprises adding the cation to the liquid composition and subsequently measuring an amount of the cation that does form a complex with the multidentate ligand, but does not involve measuring amount of the cation that does not form a complex with the multidentate ligand.

In one non-limiting embodiment, determining a measure indicative of an amount of the multidentate ligand that remains active comprises adding a known amount of calcium ions (e.g., by adding calcium chloride) to a fixed volume of the de-scaling liquid in the presence of a chemical indicator, after which the indicator changes color if solubilized calcium ions are present, a condition that can only occur when the multidentate ligand is fully inactivated (i.e., all of the multidentate ligands have formed coordination complexes with ions). The amount of calcium added prior to this point would be indicative of the chelation capacity of the multidentate ligand.

Other methods of determining a measure indicative of an amount of multidentate ligand that remains active can also be used. In certain embodiments, determining a measure indicative of an amount of multidentate ligand that remains active comprises measuring an amount of one or more anions in the liquid composition containing the multidentate ligand. Measuring the amount of one or more anions can comprise, in certain cases, measuring the amount of one or more anions as a function of time. For example, in certain cases, when a cation of the scale forms a coordination complex with the multidentate ligand, an anion from the scale (e.g., sulfate, carbonate, or any other anion from the scale) is released and solubilized. In some embodiments, the concentration of complimentary anions can be measured at one point in time (e.g., at the beginning of the cleaning process) and subsequently at one or more later points in time. These measurements may then be used to determine the quantity of cations chelated during the period of time between the measurements. This information can be used, in some embodiments (and, optionally, when coupled with any of the titration methods described above), to calculate the number of active ligands In some embodiments, determining a measure indicative of an amount of multidentate ligand that remains active comprises measuring a conductivity of the liquid composition containing the multidentate ligand. Measuring the conductivity of the liquid composition can comprise, in certain cases, measuring the conductivity as a function of time. For example, in certain cases, when a cation of the scale forms a coordination complex with the multidentate ligand, an anion from the scale is released and solubilized, and the conductivity of the liquid composition rises. In some such cases, a rise in conductivity (due to the formation of the solubilized anion) can be observed as long as the multidentate ligand remains active (and scale is being dissolved). Those of ordinary skill in the art are familiar with a variety of conductivity sensors that could be used to measure the conductivity of a liquid composition.

Any of the methods of determining a measure indicative of an amount of multidentate ligand that remains active described above can be used alone or in combination.

As noted above, certain embodiments comprise adjusting at least one system parameter based at least in part upon the determination of the measure indicative of the amount of the multidentate ligand that remains active within the liquid composition. Certain embodiments comprise, during at least a portion of time during which the liquid composition is transported through the fluidic pathway of the heat exchanger, adjusting a flow rate of the liquid composition based at least in part upon the determination of the measure indicative of the amount of the multidentate ligand that remains active within the liquid composition. For example, in some embodiments, the flow rate of the liquid composition can be increased to increase the degree to which scale is convectively transported away from the heat exchanger surface and to increase the rate at which a fixed amount of multidentate ligand within a recirculated de-scaling composition is available for further de-scaling.

In certain embodiments, determination of the measure indicative of the amount of the multidentate ligand that remains active within the liquid composition can be used to determine whether the cleaning process should be stopped. For example, according to certain embodiments, the point at which to end a cleaning process can be determined by performing multiple (e.g., at least 2, at least 5, at least 10, at least 50, at least 100, or more) measurements indicative of the amount of multidentate ligand that remains active within the de-scaling liquid. In some such embodiments, as scale is removed (to be chelated by the de-scaling liquid), the de-scaling liquid's capacity to form complexes with further scaling ions is reduced. In some embodiments, during a cleaning process, the point at which the measurements indicative of the amount of multidentate ligand that remains active stop substantially changing (e.g., changes by no more than about 1%) can indicate the point at which no scale is left to be removed. In some such embodiments, the cleaning process can be stopped (e.g., by shutting off the flow of the de-scaling liquid to the system) once the measurements indicative of the amount of multidentate ligand that remains active stops substantially changing. In one non-limiting set of embodiments, one can determine the measure indicative of the amount of the multidentate ligand that remains active prior to the de-scaling liquid entering the inlet to the heat exchanger(s) from which scale is removed (e.g., within conduit 136 of FIG. 1), and one can determine the measure indicative of the amount of the multidentate ligand that remains active after the de-scaling liquid exits an outlet of the heat exchanger(s) from which scale is removed (e.g., within conduit 134 of FIG. 1). In some such embodiments, if the measures indicative of the amount of multidentate ligand that remains active is unchanged or substantially unchanged between the inlet and outlet, the cleaning process may be stopped (as it is likely that no scale remains in the heat exchanger(s)).

Some embodiments comprise, during at least a portion of time during which the liquid composition is transported through the fluidic pathway of the heat exchanger, adjusting a level of active multidentate ligand within the liquid composition based at least in part upon the determination of the measure indicative of the amount of the multidentate ligand that remains active within the liquid composition. For example, according to certain embodiments, when a sample of the liquid composition can be saturated using only a small amount of calcium chloride, further use of the liquid composition will likely not effectively clean a scaled heat exchanger, or will likely take an inordinately long time to clean the scaled heat exchanger. Thus, according to certain embodiments, determining the measure indicative of the amount of the multidentate ligand that remains active within the liquid composition can be used to determine, at least in part, when to replace all or a portion of the de-scaling liquid during the cleaning process.

The level of active multidentate ligand within the liquid composition can be adjusted (e.g., increased or decreased) by, according to certain embodiments, at least partially (or completely) replacing a first liquid composition with a second liquid composition, wherein the second liquid composition includes a level of active multidentate ligand that is different from (e.g., greater than or less than) the level of active multidentate ligand in the first liquid composition. In some embodiments, the level of active multidentate ligand within the liquid composition can be adjusted (e.g., increased or decreased) by adding active multidentate ligand to and/or removing active multidentate ligand from a liquid composition being circulated in the system during the cleaning process. In some embodiments, adjusting the level of active multidentate ligand within the liquid composition based at least in part upon the determination of the measure indicative of the amount of the multidentate ligand that remains active within the liquid composition comprises increasing the level of active multidentate ligand within the liquid composition.

The total amount of multidentate ligand (including active multidentate ligand and inactive multidentate ligand) may be increased, may be decreased, or it may stay the same when the level of active multidentate ligand within the liquid composition is adjusted. For example, in some cases, adjusting the level of active multidentate ligand within the liquid composition comprises adding more active multidentate ligand to the liquid composition than the total amount of ligand that is removed from the liquid composition (which, in some cases, may be zero), in which case, the total amount of multidentate ligand that is present in the liquid composition is increased relative to the total amount that was present prior to the multidentate ligand level adjustment. In some instances, adjusting the level of active multidentate ligand within the liquid composition comprises adding less active multidentate ligand to the liquid composition than the total amount of ligand that is removed from the liquid composition, in which case, the total amount of multidentate ligand that is present in the liquid composition is decreased relative to the total amount that was present prior to the multidentate ligand level adjustment. In some embodiments, adjusting the level of active multidentate ligand within the liquid composition comprises adding an amount of active multidentate ligand to the liquid composition and removing the same total amount of ligand from the liquid composition, in which case, the total amount of multidentate ligand that is present in the liquid composition is the same as the total amount that was present prior to the multidentate ligand level adjustment.

According to certain embodiments, determining the measure indicative of the amount of the multidentate ligand that remains active within the liquid composition can be used to estimate the amount of time that will be required to remove the scale from the heat exchanger(s). In some embodiments, estimating the amount of time required to remove the scale from the heat exchanger(s) additionally comprises estimating the quantity of scale on the heat exchanger(s) at the start of the cleaning process. One exemplary process for estimating the quantity of scale on the heat exchanger(s) at the start of the cleaning process is described below with respect to Equation 5. According to certain embodiments, multiple (e.g., at least 2, at least 5, at least 10, at least 50, at least 100, or more) measurements indicative of the amount of multidentate ligand that remains active within the de-scaling liquid can be made. In some such embodiments, the rate at which scale is being removed from the heat exchanger(s) can be calculated based on the multiple measurements. Generally, at fixed temperature and flow conditions, the removal rate should vary only with chelation capacity and surface area of the scale, the latter of which can be approximated as a function of scale volume. Thus, in some embodiments, a mapping of removal rate to chelation capacities can be created using the multiple measurements indicative of the amount of multidentate ligand that remains active within the de-scaling liquid, and the amount of time needed to complete the scale removal process to a desired degree can be created.

Certain embodiments comprise, based at least on the estimation of the amount of time required to remove scale from the heat exchanger(s), determining the measure indicative of the amount of the multidentate ligand that remains active within the liquid composition. For example, in some embodiments, determining the measure indicative of the amount of the multidentate ligand that remains active within the liquid composition can be used to estimate the amount of time that will be required to remove the scale from the heat exchanger(s) (e.g., using the methods described above). In some such embodiments, once the estimated amount of time has passed, an additional step of determining the measure indicative of the amount of the multidentate ligand that remains active within the liquid composition can be performed. The additional step can be used, for example, to confirm the amount of scale that has been removed from the heat exchanger(s) (e.g., to confirm that all or substantially all scale has been removed from the heat exchanger(s)).

Some embodiments comprise, based at least on the estimation of the amount of time required to remove scale from the heat exchanger(s), adjusting the flow rate of the liquid composition comprising the multidentate ligand. For example, in some embodiments, determining the measure indicative of the amount of the multidentate ligand that remains active within the liquid composition can be used to estimate the amount of time that will be required to remove the scale from the heat exchanger(s) (e.g., using the methods described above). In some such embodiments, once the estimated amount of time has passed, the flow of the liquid composition comprising the multidentate ligand can be stopped (e.g., in preparation for a subsequent desalination process).

Certain embodiments comprise, based at least on the estimation of the amount of time required to remove scale from the heat exchanger(s), initiating at least one step of a subsequent desalination process. For example, in some embodiments, determining the measure indicative of the amount of the multidentate ligand that remains active within the liquid composition can be used to estimate the amount of time that will be required to remove the scale from the heat exchanger(s) (e.g., using the methods described above). In some such embodiments, once the estimated amount of time has passed, at least one step of a subsequent desalination process may be initiated. Examples of such steps include, but are not limited to, initiating the flow of a salt-containing aqueous solution that is to be desalinated through a humidifier of a desalination apparatus (e.g., via stream 110 in FIG. 1); initiating the flow of a gaseous stream through a humidifier of the desalination apparatus (e.g., stream 119 in FIG. 1); initiating the flow of a water-containing stream through a dehumidifier of the desalination apparatus (e.g., via stream 124 and/or 128 in FIG. 1); and/or initiating the heating and/or flow of a heated stream transported through a heat exchanger of the desalination apparatus (e.g., stream 130 and/or stream 120 in FIG. 1).

In some embodiments, the liquid composition used to remove scale from a heat exchanger(s) of the HDH desalination apparatus is heated (e.g., before and/or while the liquid composition is transported through the heat exchanger(s) from which scale is removed). It has been observed that, in certain cases, heating the liquid composition used to remove scale from the surface(s) of heat exchanger(s) enhances the rate of the formation of coordination complexes between the multidentate ligand and ions within the scale. Thus, in certain instances, heating the liquid composition used to remove scale from the heat exchanger(s) can reduce the amount of time needed to remove the scale from the heat exchanger(s).

Accordingly, in certain embodiments, during at least a portion of the time during which the liquid composition used to remove scale from the heat exchanger is transported through the fluidic pathway of the heat exchanger, heat is transferred to at least a portion of the liquid composition.

In some embodiments, heat transferred to the liquid composition originates from a second fluidic pathway of the heat exchanger that is being de-scaled. For example, referring to FIG. 1, in some embodiments, the liquid composition can be used to at least partially remove scale from fluidic pathway 112 of heat exchanger 106, and in some such embodiments, at least a portion of the heat transferred to the liquid composition originates from second fluidic pathway 140 of heat exchanger 106. As another example, referring to FIG. 1, in some embodiments, the liquid composition can be used to at least partially remove scale from fluidic pathway 114 of heat exchanger 108, and in some such embodiments, at least a portion of the heat transferred to the liquid composition originates from second fluidic pathway 142 of heat exchanger 108.

In certain embodiments, the liquid composition is used to remove scale from a first heat exchanger, and heat transferred to the liquid composition originates from a second heat exchanger, which can be fluidically connected to the dehumidifier of the HDH desalination apparatus. For example, referring to FIG. 1, in some embodiments, the liquid composition can be used to at least partially remove scale from fluidic pathway 112 of first heat exchanger 106, and in some such embodiments, at least a portion of the heat transferred to the liquid composition originates from second heat exchanger 108, which is fluidically connected to dehumidifier 104 (e.g., via streams 120 and 128). In some such embodiments, the second heat exchanger transfers heat from water condensed from a gaseous stream within the dehumidifier of the humidification-dehumidification desalination apparatus to the liquid composition. For example, referring to FIG. 1, in some embodiments, second heat exchanger 108 can include residual heat from the condensation of water during a prior desalination process. In some such embodiments, at least a portion of this residual heat is transferred to the liquid composition used to remove scale from heat exchanger 106, via heat exchanger 108, during the subsequent cleaning process.

In some embodiments, heat that is transferred to the liquid composition used to remove scale from the heat exchanger(s) can originate from heat that is present and/or generated during the desalination process that precedes the cleaning process. For example, in some embodiments, heat exchangers 106 and/or 108 may be heated during a desalination process (e.g., as described above). In some such embodiments, after the desalination process has been performed, heat exchangers 106 and/or 108 may remain heated, and after the cleaning process has been started, the residual heat from heat exchangers 106 and/or 108 may be transferred to the de-scaling liquid (e.g., as the de-scaling liquid is transported through fluidic pathway 112 of first heat exchanger 106 and/or fluidic pathway 114 of second heat exchanger 108).

According to certain embodiments, heat can be transferred to the heated portion of the liquid composition used to remove scale from the heat exchanger before the liquid composition is transported through the heat exchanger from which scale is removed. For example, in some embodiments, the liquid composition can be used to remove scale from fluidic pathway 112 of first heat exchanger 106, and heat may be transferred to the liquid composition while it is being transported through fluidic pathway 114 of second heat exchanger 108 (e.g., via second fluidic pathway 142 of second heat exchanger 108). In some embodiments, heat can be transferred to the heated portion of the liquid composition used to remove scale from the heat exchanger while the liquid composition is transported through the heat exchanger from which scale is removed. For example, in some embodiments, the liquid composition can be used to remove scale from fluidic pathway 112 of first heat exchanger 106, and heat may be transferred to the liquid composition while it is being transported through fluidic pathway 112 of heat exchanger 106 (e.g., via second fluidic pathway 140 of heat exchanger 106).

In some embodiments, a relatively large amount of heat can be transferred to the liquid composition used to remove scale from the heat exchanger(s) of the HDH desalination apparatus. In certain embodiments, the heat that is transferred to the liquid composition (e.g., via the second fluidic pathway of the heat exchanger being de-scaled and/or via the second heat exchanger fluidically connected to the dehumidifier) can raise the temperature of the liquid composition by at least 1° C., at least 2° C., at least 5° C., or at least 10° C., relative to the initial temperature of the liquid composition at the source. For example, referring to FIG. 1, in some embodiments, the liquid composition can be used to remove scale from fluidic pathway 112 of heat exchanger 106, and in some such embodiments, the heat that is transferred to the liquid composition via second fluidic pathway 140 of heat exchanger 106 and/or via heat exchanger 108 can raise the temperature of the liquid composition by at least 1° C. (or at least 2° C., at least 5° C., or at least 10° C.) relative to the initial temperature of the liquid composition at source 132. The "initial temperature" of the liquid composition at the source (e.g., source 132 in FIG. 1) corresponds to the temperature of the liquid composition at the outlet of the source at the startup of the cleaning process.

In certain embodiments, the heat that is transferred to the liquid composition (e.g., via the second fluidic pathway of the heat exchanger being de-scaled and/or via the second heat exchanger fluidically connected to the dehumidifier) can raise the temperature of the liquid composition by at least 1° C., at least 2° C., at least 5° C., or at least 10° C., relative to the temperature the liquid composition would have in the absence of the heat transfer but under otherwise identical conditions. For example, referring to FIG. 1, in some embodiments, the liquid composition can be used to remove scale from fluidic pathway 112 of heat exchanger 106, and in some such embodiments, the heat that is transferred to the liquid composition via second fluidic pathway 140 of heat exchanger 106 and/or via heat exchanger 108 can raise the temperature of the liquid composition by at least 1° C. (or at least 2° C., at least 5° C., or at least 10° C.) relative to the temperature the liquid composition would have in the absence of heat being transferred from fluidic pathway 140 of heat exchanger 106 and in the absence of heat being transferred from heat exchanger 108, but under otherwise identical conditions.

In some embodiments, the temperature of the liquid composition used to remove scale from the heat exchanger(s) of the HDH desalination apparatus can be at least about 35° C., at least about 40° C., at least about 45° C., or at least about 50° C. (and/or, in some embodiments, up to about 100° C.) within at least one region in which scale is being removed.

Certain embodiments are related to innovations newly developed within the context of the present invention that exploit the ability of the liquid compositions to remove scale from heat exchanger surface(s) when transported through the heat exchanger(s) at relatively low flow rates (e.g., compared to liquid compositions that do not employ multidentate ligands). It has been found experimentally that, while convective agitation increases the dissolution rate of sparingly soluble divalent salts into chelation complexes, the effect has diminishing benefits past certain threshold amounts, in many cases. The primary mechanism for controlling agitation, in many instances, is flow velocity. Certain embodiments are related to the recognition that, when using multidentate ligands in the de-scaling liquid, costs can be reduced by keeping the flow velocity at or near a level above which removal of scale via agitation does not substantially increase.

According to certain embodiments, the volumetric flow rate at which the liquid composition is transported through the heat exchanger(s) during the cleaning process is substantially lower than the volumetric flow rate of the salt-containing feed stream transported through the heat exchanger(s) during the desalination process. In some embodiments, the volumetric flow rate of the aqueous stream transported through the fluidic pathway of the heat exchanger during the desalination process is at least about 5 times, at least about 7 times, or at least about 10 times the volumetric flow rate of the liquid composition comprising the multidentate ligand transported through the fluidic pathway of the heat exchanger during the cleaning process. For example, referring to FIG. 1, in some embodiments, the volumetric flow rate of aqueous stream 110 transported through fluidic pathway 114 of heat exchanger 108 and/or transported through fluidic pathway 112 of heat exchanger 106 during the desalination process is at least about 5 times, at least about 7 times, or at least about 10 times the volumetric flow rate of stream 136 transported through fluidic pathway 114 of heat exchanger 108 and/or transported through fluidic pathway 112 of heat exchanger 106 during the cleaning process.

In some embodiments, the volumetric flow rate of the aqueous stream transported through the fluidic pathway of the heat exchanger during the desalination process is less than or equal to about 100 times, less than or equal to about 50 times, or less than or equal to about 20 times the volumetric flow rate of the liquid composition comprising the multidentate ligand transported through the fluidic pathway of the heat exchanger during the cleaning process. For example, referring to FIG. 1, in some embodiments, the volumetric flow rate of aqueous stream 110 transported through fluidic pathway 114 of heat exchanger 108 and/or transported through fluidic pathway 112 of heat exchanger 106 during the desalination process is less than or equal to about 100 times, less than or equal to about 50 times, or less than or equal to about 20 times the volumetric flow rate of stream 136 transported through fluidic pathway 114 of heat exchanger 108 and/or transported through fluidic pathway 112 of heat exchanger 106 during the cleaning process.

In some embodiments, during the cleaning process, the volumetric flow rate of the de-scaling liquid through the heat exchanger(s) from which scale is removed is at least about 10 or at least about 15 gallons per minute. In certain embodiments, during the cleaning process, the volumetric flow rate of the de-scaling liquid through the heat exchanger(s) from which scale is removed is less than about 30, less than about 25, or less than about 20 gallons per minute. In certain embodiments, during the desalination process, the volumetric flow rate of the salt-containing aqueous stream through the heat exchanger(s) from which scale is removed during the cleaning process is at least about 500, at least about 550, or at least about 600 gallons per minute. In certain embodiments, during the desalination process, the volumetric flow rate of the salt-containing aqueous stream through the heat exchanger(s) from which scale is removed during the cleaning process is less than about 1000, less than about 900, or less than about 800 gallons per minute.

For the purposes of comparing the volumetric flow rate of the aqueous stream transported through the fluidic pathway of the heat exchanger during the desalination process and the volumetric flow rate of the liquid composition comprising the multidentate ligand transported through the fluidic pathway of the heat exchanger during the cleaning process, the volumetric flow rates are both calculated as time averages. In each case, the volumetric flow rate is determined at the entrance of the heat exchanger from which scale is removed during the cleaning process (and, when scale is removed from more than one heat exchanger, at the entrance of the first heat exchanger from which scale is removed during the cleaning process). To illustrate, to calculate the volumetric flow rate of the liquid composition comprising the multidentate ligand transported through the fluidic pathway of the heat exchanger during the cleaning process, the total volume of liquid transported through the fluidic pathway of the heat exchanger during the cleaning process is determined (as measured at the inlet of the heat exchanger), and the time averaged volumetric flow rate is calculated by dividing the total volume of liquid by the time over which the liquid was transported through the fluidic pathway of the heat exchanger. To calculate the volumetric flow rate of the aqueous stream transported through the fluidic pathway of the heat exchanger during the desalination process, the total volume of salt-containing feed transported through the fluidic pathway of the heat exchanger during the desalination process is determined (as measured at the inlet of the heat exchanger), and the time averaged volumetric flow rate is calculated by dividing the total volume of liquid by the time over which the liquid was transported through the fluidic pathway of the heat exchanger. Those of ordinary skill in the art are familiar with flow meters that may be used to measure volumetric flow.

According to certain embodiments, one or more conduits used to deliver the de-scaling liquid can be configured to be closeable (e.g., using a valve or any other suitable device). By configuring one or more of these conduits to be closeable, according to some such embodiments, the source of the de-scaling liquid can be isolated from the HDH desalination apparatus, which can be beneficial in some cases when operating the HDH desalination apparatus (e.g., in cases where flow of the salt-containing liquid from stream 110 out of the HDH desalination apparatus via conduits 134 and/or 136 is not desirable) and/or when performing system maintenance (e.g., in certain instances in which the de-scaling liquid within source 132 is being replaced or modified). In some embodiments, a conduit connecting the source of the liquid composition to the heat exchanger (e.g., conduit 134 and/or conduit 136) is closeable. For example, in some cases, conduit 134 can be closed using optional valve 150. In certain embodiments, conduit 136 can be closed using optional valve 152. In certain embodiments, recycling at least a portion of the liquid composition from the fluidic pathway of the heat exchanger back to the source of the liquid composition comprises transporting at least the portion of the liquid composition from the fluidic pathway of the heat exchanger back to the source of the liquid composition via a closeable conduit. For example, referring to FIG. 1, in some embodiments, conduit 134 is closeable (e.g., using optional valve 150), and recycling at least a portion of the de-scaling liquid from fluidic pathway 114 of heat exchanger 108 and/or fluidic pathway 112 of heat exchanger 106 back to source 132 comprises transporting at least the portion of the liquid composition from fluidic pathway 114 of heat exchanger 108 and/or from fluidic pathway 112 of heat exchanger 106 back to source 132 via conduit 134.

According to certain embodiments, the cleaning process can be used to remove a relatively large amount of scale from the surface(s) of the heat exchanger(s) of the HDH desalination apparatus. For example, in some embodiments, transporting the liquid composition comprising the multidentate ligand through the fluidic pathway of the heat exchanger removes at least about 50 wt %, at least about 60 wt %, at least about 70 wt %, at least about 80 wt %, at least about 90 wt %, at least about 95 wt %, at least about 98 wt %, at least about 99 wt %, or at least about 99.9 wt % of scale present within the heat exchanger prior to transporting the liquid composition comprising the multidentate ligand through the fluidic pathway of the heat exchanger.

As noted above, in some embodiments, the removal of scale from the heat exchanger(s) of the HDH desalination apparatus is part of a cleaning process that is performed after a desalination process. According to certain embodiments, the transition from the desalination process to the cleaning process may comprise one or more of the following steps:
 isolating humidifier 102 from heat exchanger 106 and/or heat exchanger 108, for example, by closing optional valve 156;
 isolating the source of the aqueous liquid containing at least one dissolved salt from heat exchanger 106 and/or heat exchanger 108, for example, by closing optional valve 154;
 transferring de-scaling liquid from a container into source 132;
 opening optional valve 152 to allow for fluid transport from source 132 to heat exchanger 106 and/or to heat exchanger 108;
 opening optional valve 150 to allow for fluid transport from heat exchanger 106 and/or heat exchanger 108 to source 132;
 flushing heat exchanger 106 and/or heat exchanger 108 with fresh water and/or a salt-containing aqueous solution (e.g., pretreated brine); and
 flushing conduit(s) between source 132 and heat exchanger 106 and/or heat exchanger 108 with fresh water and/or a salt-containing aqueous solution (e.g., pretreated brine).

In some embodiments, after the transition from the desalination process to the cleaning process has been completed, the liquid composition can be transported from source 132 to heat exchanger 106 and/or heat exchanger 108. In some such embodiments, at least a portion of the liquid composition can be recycled from heat exchanger 106 and/or heat exchanger 108 back to source 132 (e.g., in a closed loop or partially closed loop).

In certain embodiments, after scale has been removed from the heat exchanger(s) of the HDH desalination apparatus, the HDH desalination apparatus can be used to perform a subsequent, second desalination process. According to certain embodiments, the transition from the cleaning process to the second desalination process may comprise one or more of the following steps:
 removing liquid from heat exchanger 106 and/or heat exchanger 108, optionally by transporting a gas through the heat exchangers to remove at least a portion of the residual liquid in the heat exchangers;
 removing liquid from the conduit(s) connecting heat exchanger 106 and/or heat exchanger 108 to source 132, optionally by transporting a gas through the conduits to remove at least a portion of the residual liquid in the conduits;
 collecting drained liquid in source 132;
 discharging spent de-scaling liquid;
 isolating heat exchanger 106 and/or heat exchanger 108 from source 132, for example, by closing optional valves 150 and 152; and
 opening optional valves 154 and/or 156 to allow for the transport of the salt-containing aqueous stream from its source to heat exchanger 106 and/or heat exchanger 108 and subsequently to humidifier 102.

Certain embodiments comprise determining a measure indicative of scale buildup within the heat exchanger(s) of the HDH desalination apparatus during the desalination process, and beginning the cleaning process based, at least in part, on the determination of the measure indicative of scale buildup. In some embodiments, determining the measure indicative of scale buildup comprises determining a measure indicative of reduced heat transfer through the heat exchanger(s) of the HDH desalination apparatus. In some such embodiments, determining the measure indicative of reduced heat transfer can also be used, at least in part, to estimate the amount of scale that has formed within the heat exchanger(s) of the HDH desalination apparatus.

The degree of heat transfer through a particular heat exchanger can be calculated, for example, as follows, using heat exchanger 106 in FIG. 1 as a reference. In some embodiments, the flow rate of stream 130 through fluidic pathway 140 ($\dot{V}$), the temperature of stream 130 at the inlet of fluidic pathway 140 of heat exchanger 106 ($T_1$), and the temperature of stream 130 at the outlet of fluidic pathway 140 of heat exchanger 106 ($T_0$) can be measured. Generally, stream 130 will have a known density ($\rho$) and specific heat capacity ($C_p$), and the total heat transfer to stream 110 (Q) can be calculated as:

$$\dot{Q} = \dot{V} \rho c_p (T_1 - T_0) \qquad [1]$$

While measurements based on the temperatures of stream 110 could also be used, the salt concentration can, in certain cases, affect the density and specific heat capacity, which can introduce a degree of error into the calculation, particularly in operational modes where the concentration may change frequently.

Referring back to FIG. 1, the logarithmic mean temperature difference (LMTD) of heat exchanger 106 can be calculated as follows:

$$LMTD = \frac{\Delta T_A - \Delta T_B}{\ln \Delta T_A - \ln \Delta T_B} \qquad [2]$$

In this equation, $\Delta T_A$ is calculated as the temperature of stream 130 at the inlet to fluidic pathway 140 minus the temperature of stream 110 at the outlet of fluidic pathway 112. $\Delta T_B$ is calculated as the temperature of stream 130 at the outlet of fluidic pathway 140 minus the temperature of stream 110 at the inlet of fluidic pathway 112.

The heat transfer coefficient (U) for the heat exchanger can then be calculated by rearranging the following equation:

$$\dot{Q} = U \cdot A_{HX} \cdot LMTD \qquad [3]$$

into the form, $$U = \frac{\dot{Q}}{A_{HX} \cdot LMTD} \qquad [4]$$

where U is the overall heat transfer coefficient for the heat exchanger; Q is the total heat transfer calculated using Equation 1 above; LMTD is the logarithmic mean temperature difference calculated using Equation 2 above; and A represents the heat transfer area, which is a fixed value given by the geometry of the heat exchanger.

In certain embodiments, the heat transfer coefficient can be plotted against time. The operation above may be applied, according to certain embodiments, continuously to time-stamped data points (e.g., collected by temperature and/or volumetric flow rate sensors), or applied to a collection of time-stamped data points compiled into a spreadsheet. According to certain embodiments, scaling is indicated by a substantial (e.g., at least 5%) and sustained (e.g., over a period of at least about 30 seconds) decrease in the heat transfer coefficient.

While determining a measure indicative of reduced heat transfer through the heat exchanger(s) of the HDH desalination apparatus can be complicated, it can offer certain additional benefits (in some, although not necessarily all, embodiments) over other methods of detecting scale. For example, in some cases, by accurately determining the measure indicative of reduced heat transfer through the heat exchanger(s) of the HDH desalination apparatus, the effect of scaling on the heat transfer can be separated from process conditions. Separate scaling events can be compared, according to certain embodiments, even if the process conditions change. Additionally, in some embodiments, a resistance model can be used to estimate the quantity of scale formed.

In some embodiments, determining a measure indicative of reduced heat transfer through the heat exchanger(s) of the HDH desalination apparatus can be used to estimate the quantity of scale formed in the heat exchanger(s). For example, if one assumes that the thickness of the scale that is formed is substantially constant, and the heat exchanger is assumed to have a relatively uniform stream to stream temperature difference at all points, the following equation can be applied across the entire heat exchange surface:

$$\dot{Q} = \frac{\Delta T}{R_{HX} + \frac{t_{scale}}{k_{scale} \cdot A_{HX}}} \qquad [5]$$

$R_{HX}$, above, represents the thermal resistance of the heat exchanger without fouling; $t_{scale}$ represents the thickness of the scale; $k_{scale}$ represents the thermal conductivity of the scale; and $A_{HX}$ represents the heat exchange area of the heat exchanger. According to certain embodiments, by solving Equation 5 for $t_{scale}$, the thickness of the scale is estimated, which can, in some cases, then be used to estimate the volume and/or mass of scale formed.

According to certain embodiments, the source of the de-scaling liquid (e.g., source 132 in FIG. 1) comprises at least one vessel, such as a tank. In some such embodiments, the volume of the source (which can be made up of one or more vessels) is greater than the volume of de-scaling liquid required to fill the fluidic pathways of the heat exchanger(s) from which scale is removed during the cleaning process. In some such embodiments, the volume of the source is greater than the volume of de-scaling liquid required to fill the volume of the remainder of the fluidic circuit between the source and the heat exchanger(s) during the cleaning process. The "remainder of the fluidic circuit," in this context, includes the volumes of the fluidic pathways of the heat exchanger(s) from which scale is removed during the cleaning process, and all conduits connecting the source and the fluidic pathways of the heat exchanger(s) from which scale is removed during the cleaning process, but excludes the volume of the source itself.

In some embodiments, the source of the de-scaling liquid has a volume of at least about 10 gallons, at least about 50 gallons, at least about 90 gallons, at least about 150 gallons, at least about 300 gallons, at least about 500 gallons, or more.

The liquid composition used to remove scale from the heat exchanger(s) of the HDH desalination apparatus can be transported through the system using a variety of suitable flow devices such as pumps, vacuum sources, or any other suitable device. In some embodiments, one or more diaphragm pumps (e.g., air-operated diaphragm pumps) can be used to transport de-scaling liquid through the heat exchanger(s) of the HDH desalination apparatus. In certain embodiments, one or more centrifugal pumps can be used to transport de-scaling liquid through the heat exchanger(s) of the HDH desalination apparatus.

In some embodiments, a filter can be positioned between the heat exchanger(s) from which scale is removed and the source of the de-scaling liquid (e.g., within conduit 134 and/or within conduit 136 in FIG. 1). According to certain embodiments, the filter can be configured to remove solid scale that has detached from the surface(s) of the heat exchanger(s) but that has not been completely solubilized by the de-scaling liquid. Examples of suitable filters include, but are not limited to, bag filters and disc filters.

Various of the unit operations described herein can be "directly fluidically connected" to other unit operations and/or components. Generally, a direct fluidic connection exists between a first unit operation and a second unit operation (and the two unit operations are said to be "directly fluidically connected" to each other) when they are fluidically connected to each other and no fluid component changes in relative abundance by more than 1% as the fluid is transported from the first unit operation to the second unit operation. In certain embodiments in which two units are directly fluidically connected, the phase of the fluid leaving the first unit is the same as the phase of the fluid entering the second unit. As an illustrative example, a stream that connects first and second unit operations, and in which the pressure and temperature of the fluid is adjusted but the composition of the fluid is not altered, would be said to directly fluidically connect the first and second unit operations. If, on the other hand, a separation step is performed and/or a chemical reaction is performed that alters the composition of the stream contents during passage from the first component to the second component such that at least one component changes in relative abundance by more than 1%, the stream would not be said to directly fluidically connect the first and second unit operations.

U.S. Provisional Patent Application Ser. No. 62/256,852, filed Nov. 18, 2015, and entitled "Scale Removal in Humidification-Dehumidification Systems" is incorporated herein by reference in its entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for removing scale from a heat exchanger of a humidification-dehumidification desalination apparatus, comprising:
    transporting a liquid composition comprising a multidentate ligand from a source of the liquid composition through a fluidic pathway of the heat exchanger to at least partially remove the scale from the heat exchanger, the fluidic pathway of the heat exchanger fluidically connected to an inlet of a humidifier of the humidification-dehumidification desalination apparatus, the humidifier of the humidification-dehumidification desalination apparatus being fluidically connected to a dehumidifier of the humidification-dehumidification desalination apparatus;
    during at least a portion of time during which the liquid composition is transported through the fluidic pathway of the heat exchanger:
        determining a measure indicative of an amount of the multidentate ligand that remains active within the liquid composition; and
        adjusting at least one of a flow rate of the liquid composition and a level of active multidentate ligand within the liquid composition based at least in part upon the determination of the measure indicative of the amount of the multidentate ligand that remains active within the liquid composition.

2. The method of claim 1, further comprising recycling at least a portion of the liquid composition from the fluidic pathway of the heat exchanger back to the source of the liquid composition.

3. The method of claim 1, wherein determining a measure indicative of an amount of the multidentate ligand that remains active comprises adding a cation to the liquid composition and subsequently determining a measure indicative of an amount of the cation that does not form a complex with the multidentate ligand.

4. The method of claim 1, comprising, during at least a portion of time during which the liquid composition is transported through the fluidic pathway of the heat exchanger, adjusting a flow rate of the liquid composition based at least in part upon the determination of the measure indicative of the amount of the multidentate ligand that remains active within the liquid composition.

5. The method of claim 1, comprising, during at least a portion of time during which the liquid composition is transported through the fluidic pathway of the heat exchanger, adjusting a level of active multidentate ligand within the liquid composition based at least in part upon the determination of the measure indicative of the amount of the multidentate ligand that remains active within the liquid composition.

6. The method of claim 1, wherein:
    transporting the liquid composition comprising the multidentate ligand is part of a cleaning process performed after a desalination process; and
    the desalination process comprises:
        transporting an aqueous stream containing at least one dissolved salt through the fluidic pathway of the heat exchanger and subsequently through the humidifier of the humidification-dehumidification desalination apparatus such that at least a portion of the water from the aqueous stream is evaporated, within the humidifier, from the aqueous stream to produce a concentrated stream enriched in the at least one dissolved salt relative to the aqueous stream transported to the humidifier and a humidified gaseous stream; and
        condensing, within the dehumidifier of the humidification-dehumidification desalination apparatus, water from the humidified gaseous stream to produce a water-containing stream and a dehumidified gaseous stream.

7. The method of claim 1, wherein transporting the liquid composition comprising the multidentate ligand through the fluidic pathway of the heat exchanger removes at least about 50 wt % of scale that was present within the heat exchanger prior to transporting the liquid composition comprising the multidentate ligand through the fluidic pathway of the heat exchanger.

8. The method of claim 1, wherein the scale comprises a salt comprising at least one of $Mg^{2+}$, $Ca^{2+}$, $Sr^{2+}$, $Ba^{2+}$, a carbonate anion, a bicarbonate anion, a sulfate anion, a bisulfate anion, dissolved silica, and/or a hydroxide anion.

9. The method of claim 1, wherein the multidentate ligand comprises diethylenetriaminepentaacetic acid (DTPA).

10. The method of claim 1, wherein the liquid composition transported through the fluidic pathway of the heat exchanger comprises oxalate anions.

11. The method of claim 1, wherein the liquid composition transported through the fluidic pathway of the heat exchanger has a pH of at least about 8.

12. The method of claim 1, wherein the humidifier contains packing.

13. The method of claim 1, wherein the humidifier is a bubble-column humidifier.

14. The method of claim 2, wherein the fluidic pathway is a first fluidic pathway, and during at least a portion of the time during which the liquid composition is transported through the first fluidic pathway of the heat exchanger, heat is transferred from a second fluidic pathway of the heat exchanger to at least a portion of the liquid composition.

15. The method of claim 2, wherein the heat exchanger is a first heat exchanger, and during at least a portion of the time during which the liquid composition is transported through the fluidic pathway of the first heat exchanger, heat is transferred from a second heat exchanger to at least a portion of the liquid composition, the second heat exchanger fluidically connected to the dehumidifier of the humidification-dehumidification desalination apparatus.

16. The method of claim 3, wherein determining a measure indicative of an amount of the cation that does not form a complex with the multidentate ligand comprises measuring an amount of the cation that remains dissociated within the liquid composition.

17. The method of claim 6, wherein a volumetric flow rate of the aqueous stream transported through the fluidic pathway of the heat exchanger during the desalination process is at least about 5 times a volumetric flow rate of the liquid composition comprising the multidentate ligand transported through the fluidic pathway of the heat exchanger during the cleaning process.

18. The method of claim 15, wherein the second heat exchanger transfers heat from water condensed from a gaseous stream within the dehumidifier of the humidification-dehumidification desalination apparatus to the portion of the liquid composition.

19. The method of claim 15, wherein the heat that is transferred to the portion of the liquid composition raises the temperature of the portion of the liquid composition by at least 1° C., relative to the initial temperature of the liquid composition at the source.

20. The method of claim 15, wherein the heat that is transferred to the portion of the liquid composition raises the temperature of the portion of the liquid composition by at least 1° C., relative to the temperature the liquid composition would have in the absence of the heat transfer but under otherwise identical conditions.

21. The method of claim 17, wherein the volumetric flow rate of the aqueous stream transported through the fluidic pathway of the heat exchanger during the desalination process is less than or equal to about 100 times the volumetric flow rate of the liquid composition comprising the multidentate ligand transported through the fluidic pathway of the heat exchanger during the cleaning process.

\* \* \* \* \*